United States Patent [19]
Fattouche et al.

[11] Patent Number: 5,890,068
[45] Date of Patent: Mar. 30, 1999

[54] WIRELESS LOCATION SYSTEM

[75] Inventors: Michel T. Fattouche; Richard W. Klukas; Andrew L. Borsodi; Mark Astridge; Gerard J. Lachapelle; Hatim Zaghloul, all of Calgary, Canada

[73] Assignee: Cell-Loc Inc., Calgary, Canada

[21] Appl. No.: 725,560

[22] Filed: Oct. 3, 1996

[51] Int. Cl.⁶ ..................................................... H04B 7/26
[52] U.S. Cl. ............................ 455/456; 342/457; 70/207
[58] Field of Search ..................................... 455/456, 457, 455/507, 577, 524, 526, 440, 67.1, 67.6; 342/357, 451, 457; 701/207; 340/905

[56] References Cited

U.S. PATENT DOCUMENTS

| | | |
|---|---|---|
| 3,384,891 | 5/1968 | Anderson . |
| 3,646,580 | 2/1972 | Fuller et al. . |
| 3,680,121 | 7/1972 | Anderson et al. . |
| 4,177,466 | 12/1979 | Reagan . |
| 4,297,701 | 10/1981 | Henriques . |
| 4,433,335 | 2/1984 | Wind . |
| 4,596,988 | 6/1986 | Wanka . |
| 4,638,321 | 1/1987 | Drogin . |
| 4,639,733 | 1/1987 | King et al. . |
| 4,651,156 | 3/1987 | Martinez . |
| 4,651,157 | 3/1987 | Gray et al. . |
| 4,728,959 | 3/1988 | Maloney et al. . |
| 4,742,357 | 5/1988 | Rackley . |
| 4,791,572 | 12/1988 | Green, III et al. . |
| 4,818,998 | 4/1989 | Apsell et al. . |
| 4,870,422 | 9/1989 | Counselman, III . |
| 4,891,650 | 1/1990 | Sheffer . |
| 4,908,629 | 3/1990 | Apsell et al. . |
| 4,916,455 | 4/1990 | Bent et al. . |
| 4,926,161 | 5/1990 | Cupp . |
| 4,975,710 | 12/1990 | Baghdady . |
| 5,003,317 | 3/1991 | Gray et al. . |
| 5,008,679 | 4/1991 | Effland et al. . |
| 5,023,809 | 6/1991 | Spackman et al. . |
| 5,023,900 | 6/1991 | Tayloe et al. . |
| 5,055,851 | 10/1991 | Sheffer . |
| 5,095,500 | 3/1992 | Tayloe et al. . |
| 5,101,501 | 3/1992 | Gilhousen et al. . |
| 5,126,748 | 6/1992 | Ames et al. . |
| 5,128,623 | 7/1992 | Gilmore . |
| 5,153,902 | 10/1992 | Buhl et al. . |
| 5,208,756 | 5/1993 | Song . |
| 5,218,618 | 6/1993 | Sagey . |
| 5,293,645 | 3/1994 | Sood . |
| 5,317,323 | 5/1994 | Kennedy et al. . |
| 5,327,144 | 7/1994 | Stilp et al. . |
| 5,412,388 | 5/1995 | Attwood ................................ 701/207 |
| 5,570,305 | 10/1996 | Fattouche et al. . |
| 5,666,662 | 9/1997 | Shibuya ................................ 455/456 |
| 5,724,660 | 3/1998 | Kauser et al. ........................ 455/456 |

FOREIGN PATENT DOCUMENTS

| | | |
|---|---|---|
| 2108103 | 4/1995 | Canada . |
| WO 93/06685 | 4/1993 | WIPO . |

OTHER PUBLICATIONS

Smith, Jr., William Whitfield, School of Electrical Engineering, Georgia Institute of Technology, Atlanta, Georgia, Passive Location of Mobile Cellular Telephone Terminals, IEEE, CH3031–2/91/0000–0221, 1.001991.

Hata, M., "Empirical Formula for Radio Propagation Loss in Land Mobile Radio Services," IEEE Transactions on Vehicular Technology, vol. VT–29, No. 3, Aug. 1980.

(List continued on next page.)

*Primary Examiner*—Thanh Cong Le
*Attorney, Agent, or Firm*—Christensen O'Connor Johnson & Kindness PLLC

[57] ABSTRACT

The position of a Wireless Transceiver (WT) is estimated using the Time Of Arrival (TOA) at several Monitoring Sites (MS) of the signal transmitted by the WT. Several sites are used to solve for the coordinates of the WT using hyperbolic trilateration. A time reference is used to synchronize the Monitoring Sites (MS). Super-Resolution (SR) techniques are applied to increase the resolution of the TOA estimate obtained via correlation of the received signal at each MS. SR techniques can improve the TOA resolution substantially.

37 Claims, 17 Drawing Sheets

OTHER PUBLICATIONS

Dumont, L.R., et al., "Super–resolution of Multipath Channels in a Spread Spectrum Location System," IEEE Electronic Letters, vol. 30, No. 19, pp. 1583–1584, Sep. 15, 1994.

Schmidt, R., "Least Squares Range Difference Location," IEEE Transactions on Aerospace and Electronic Systems, vol. 32, No. 1, Jan. 1996.

Turin, G.L. et al., "A Statistical Model of Urban Multipath Propagation," IEEE Transactions on Vehicular Technology, vol. VT–21, No. 1, Feb. 1972.

Smith, J.O. et al., "Closed–Form Least–Squares Source Location Estimation from Range–Difference Measurements," IEEE Transactions on Acoustics, Speech, and Signal Processing, vol. ASSP–35, No. 12, Dec. 1987.

Ziskind, I. et al., "Maximum Likelihood Localization of Multiple Sources by Alternating Projection," IEEE Transactions on Acoustics, Speech, and Signal Processing, vol. ASSP–36, No. 10, Oct. 1988.

Morley, G.D. et al., "Improved Location Estimation with Pulse–ranging in Presence of Shadowing and Multipath Excess–delay Effects," Electronics Letters, vol. 31, No. 18, pp. 1609–1610, Aug. 1995.

WIRELESS LOCATION SYSTEM

FIELD OF THE INVENTION

This invention relates to positioning, location finding and tracking of Wireless Transceivers (WTs) particularly wireless telephones and radio tags.

BACKGROUND OF THE INVENTION

Wireless telephones include cellular, cordless, mobile and PCS (Personal Communication Systems) telephones while radio tags include passive and active RF identification tags.

The need for wireless location finding and tracking of wireless telephones and radio tags is ever increasing. Some of the possible services for locating radio tags are for monitoring children, herds, valuable goods, toxic waste, fleet management, etc. Some of the possible services for locating wireless telephones are:

Enhanced Emergency Services:

In recent years pressure has been mounting for the development of technology to position cellular telephones. The primary driving force has been enhanced 911 (E911) services for wireless telephone subscribers. E911 services provide the 911 operator with information such as calling number, address, and the primary subscriber's name. This enables the operator to dispatch emergency response teams without waiting for the caller to provide their position verbally. Due to the nature of wireless services, the location of the caller is currently only available via verbal communication. The only positional information that may be derived from the current cellular infrastructure is the cell site with which the cellular caller is communicating. For cell sizes in the order of kilometers, this is not sufficient.

A notice of proposed rule making concerning E911 emergency calling systems was released by the FCC on Oct. 19, 1994 (CC Docket No. 94-102). In the document the FCC proposes to require that within five years of the rules being adopted, a wireless 911 caller be located in a three-dimensional environment within a radius of no more than 125 m with probability of 100%. Since this accuracy requirement is somewhat unreasonable, on Dec. 19, 1995 a technology working group composed of representatives of the Cellular Telecommunications Industry Association (CTIA), the National Emergency Number Association (NENA), and the National Association of State Nine-One-One Administrators (NASNA), reached an agreement to recommend an alternative. The recommendation is to require a wireless location technology capable of a horizontal accuracy of 125 m RMS within five years of the rule making. A vertical component is not required at this time. A horizontal accuracy of 125 m DRMS (Distance Root Mean Squared) equates to a 63% probability circle of radius 125 m.

Any location technology adopted should be capable of the above accuracy at the lowest possible cost and with minimal impact on the network and subscriber equipment. The use of GPS to determine position at the cellular telephone has been proposed in Grimes, U.S. Pat. No. 5,479,482 issued Dec. 26, 1995 and as in Bird, U.S. Pat. No. 5,418,537 issued May 23, 1995. However, a positioning system based on GPS equipped telephones would make all current telephones obsolete and would require a change to the signal standards in order to accommodate the positional information such as Sood, U.S. Pat. No. 5,293,645 issued Mar. 8, 1994. In addition, such a system would suffer the same line of sight availability limitations as GPS. It would suffer tremendously wherever the GPS signals are blocked such as in buildings, vehicles, tunnels etc., areas considered critical from an emergency point of view.

Smith, W. W. Jr.,"Passive Location of Mobile Cellular Telephone Terminals," Proceedings 25th annual IEEE International Carnahan Conference on Security Technology, Taipei, Taiwan, Oct 1–3, 1991, describes techniques for locating AMPs-based cellular telephones.

Tracking of Fraudulent Calls:

There is a general agreement that fraudulent calls cause a major revenue loss to the cellular service providers due to congestion and increased blockage of cellular calls, particularly during peak hours.

Tracking of Stolen Vehicles:

Conventionally, to track stolen vehicles requires installing an RF tag such as in Bird, U.S. Pat. No. 5,418,537 issued May, 23, 1995, leaving it permanently on in each vehicle to be tracked and a new infrastructure for the MSs throughout the desired service area.

Fleet Management for Courier and Transportation Businesses:

To manage fleet one may instal an RF tag such as in Song, U.S. Pat. No. 5,208,756 issued May, 4, 1993, and Sheffer et al., U.S. Pat. No. 5,218,367 issued Jun. 8, 1993, but this requires additional equipment to be added to the fleet.

Location Finding of Wireless Telephones:

This is envisioned to be a 1-900 service where the person dialing pays for the service. Basically, to know the location of any wireless telephone, one dials 1-900-TELFIND and gets prompted for a password which is provided to subscribers to the service (for security purposes). Upon validation of the telephone number and password, in about 20 seconds the telephone could be located. The coordinates could be given in one of many formats:

5.1 Longitude and latitude;

5.2 Street address;

5.3 Location on maps provided when subscribing to the service (e.g. page 54 G-4) which then pinpoints to a certain box on a map; and 5.4 Electronic for inputting into other databases.

Pursuit of Criminals:

To allow law enforcement agencies to find and track wanted criminals who use wireless telephones.

It is clear therefore that there are many applications for a wireless location system. The wireless location system, however, faces technological challenges. Two of these challenges are location accuracy, and processing time (to provide a location reading).

Location Accuracy:

Theoretically, the location accuracy performance for a wireless location technology is lower-bounded by the Cramer-Rao lower bound on the rms location error which depends directly on two factors:

1) the bandwidth (BW) of the transmitted radio signal, and 2) the signal-to-noise ratio (SNR) of the received radio signal.

Practically, in a wireless location system, many other factors affect the performance depending on the technology used:

1) multipath, 2) clock error, 3) frequency offsets, 4) interference (co-channel and adjacent), 4) time synchronization and 5) geographical geometry of the location acquisition stations.

In AMPs for example, the radio frequency (RF) channels are spaced by 30 KHz which is a relatively small BW compared to systems designed primarily for location such as GPS with a BW of 1 MHz over C/A (Coarse Acquisition) channels and ISM-based location systems with a typical bandwidth of 10 MHz. In GPS, the location system uses initially a conventional sliding correlator to obtain a set of pseudo-ranges (one pseudo-range per satellite). The pseudo-ranges are then used in trilateration to obtain a position fix of the GPS receiver. A typical accuracy for a commercial one point (i.e. no differential reception) GPS receiver with C/A code is around 30 m rms without Selective Availability (SA). In direct proportions, an AMPs land-based location system which uses initially a conventional sliding correlator at each location acquisition station to obtain a TOA estimate of the transmitted radio signal followed by a hyperbolic (differential) trilateration of all the TOA estimates (at some central site) should offer a location accuracy of around an unacceptable 900 m rms assuming no multipath.

When multipath is considered, the accuracy of the AMPs land-based TDOA location system could potentially degrade even further. The cellular frequency band is between 800 and 900 MHz and the propagation characteristics at these UHF frequencies will have a significant impact on positioning by trilateration as shown in Parsons D., "The Mobile Radio Propagation Channel," John Wiley & Sons, New York, 1992. That the ranges measured correspond to Line Of Sight (LOS) distances is a major assumption made when estimating position by trilateration. Although the dominant transmission mode in this band is LOS, reflections from natural and man-made objects as well as diffraction around said objects are also possibilities. Multipath and diffraction allow the cellular signal to propagate in heavily built up areas as well as indoors. However, they also cause the measured ranges to be longer than the true LOS distance which introduces error into the trilateration process. In addition, the propagation distance at UHF is relatively short. This allows frequency reuse in the cellular system but limits the number of observables in the trilateration process. For instance, in a dense urban environment with a delay spread of 3 microseconds (as shown in Hata, M., "Empirical Formula for Radio Propagation Loss in Land Mobile Radio Services," IEEE Transactions on Vehicular Technology, Vol. VT-29, No. 3, August 1980) multipath causes the location accuracy to degrade to more than 1400 m rms.

From the above one might conclude that a GPS system offers a much better accuracy of the TOA estimate than a land-based AMPs system using a conventional correlator. Correlation is an effective method of estimating TOA when the signal is known. The resolution of TOA estimation by correlation is a function of the bit rate and hence the bandwidth. In GPS receivers, correlators are an integral part of the delay lock loop (DLL) mechanism used to track satellite signals as shown in Spilker, J. J., "GPS Signal Structure and Performance Characteristics," Global Positioning System, Volume I, The Institute of Navigation, Washington D.C., 1980. Spread spectrum codes used to spread the satellite signals serve two primary purposes:

The first purpose is to enable multiple access to the L1 and L2 carrier frequencies. This allows each satellite to transmit data over a common frequency channel.

The second purpose is to allow for pseudoranging. The time delay between the received satellite code and the code replica within the receiver is a measure of the range between the satellite and receiver. Since the satellite signal is continuous a delay lock loop is able to track the signal. This enables the signal to be despread and the data demodulated. GPS, however, requires additional equipment to be installed with the wireless transceivers.

In terms of time for the location information to be available, GPS receivers require several minutes from a cold start to attain an acceptable reading. By contrast, in an AMPs land-based location system, for example, the time for the location information to be available depends on two factors:

1) the time to post-process the correlation lobe, and 2) the type of signal monitored.

In Lo, U.S. Pat. No. 5,293,642 issued Mar. 8, 1994 and in Kennedy et al., U.S. Pat. No. 5,317,323 issued May 31, 1994, the post-processing time is relatively long due to its complexity. For example, in Kennedy et al., U.S. Pat. No. 5,317,323 issued May 31, 1994, the patent improves the location accuracy of a WT using a beam-former to reject multipath. Such an algorithm requires a number of antennas (typically eigth), a receiver following each antenna and an extremely powerful processor to combine all received signals in such a way to be able to form a beam in a desired direction.

One alternative to GPS is to use the cellular signals themselves. There are essentially two types of cellular signals to monitor: the signal on the reverse control channel and the signal on the reverse voice channel. Although treated as a spread spectrum code for the purpose of pseudoranging, both signals are not continuous and do not consist entirely of Pseudo Random Noise (PRN) codes. Therefore, it is not necessary to employ a DLL to track them for the purpose of despreading. Instead, one can use convolution to estimate TOA. Convolution of the received signal with a stored replica of the transmitted signal results in a correlation peak at the delay between the two signals. Rather than convolve in the time domain, it is sometimes more convenient to multiply in the frequency domain. Both the received signal and its replica are first transformed to the frequency domain where they are multiplied and the result inverse transformed to the time domain. Although the result of this process will give a correlation function from which a TOA may be derived, the resolution is limited to that of the Fourier transform. The traditional resolution bound on Fourier-based methods is the Rayleigh resolution criterion as shown in Haykin, S., "Adaptive Filter Theory," 2nd Edition, Prentice Hall, Englewood Cliffs, N.J., 1991, wherein the Rayleigh resolution is the inverse of the sampling period. Thus, conventionally, the resolution of a system based on the TOA of cellular signals does not approach the resolution of GPS based wireless location systems.

SUMMARY OF THE INVENTION

In this patent instead, we improve the location accuracy of a WT using a TOA super-resolution algorithm that requires one antenna and is designed to rely mainly on the Fast Fourier Transform (FFT) since it is an efficient implementation of the Fourier Transform and is available readily on Digital Signal Processor (DSP) chips.

A super-resolution algorithm is defined as one in which the resolution is greater than the Rayleigh resolution.

For illustrative purposes, an AMPs-based cellular telephone is used as an example for the WT to be located. Two reasons exist for such a choice:

(1) AMPs, the North American analog standard for cellular telephones, is widely used in North America with about 26 million subscribers;

(2) The environment where AMPs-based cellular telephones exist makes a horizontal accuracy of 125 m DRMS extremely difficult to attain without use of the current invention. The inventors have implemented a system based on the current invention to locate AMPs-based cellular telephone with a horizontal accuracy approaching 115 m.

Such a choice for a WT does not preclude using the invention with any other standard such as IS-54, IS-95, GSM, DECT, PHS, CDPD, etc., or any other WT such as radio tags.

The AMPs signal that is to be monitored may be either:

1) the Reverse Analog Control Channel (RECC), and
2) the Reverse Analog Voice Channel (RVC).

The RECC carries data and can be easily monitored. It is used for registering the mobile subscriber with a specific base station, answering pages and for placing calls. It can be used in a TDOA as well as an Angle-of-Arrival (AOA) location system. It consists of a precursor followed by several repeated words that contain information regarding the mobile subscriber and the calling number. Therefore, a 911 call can be easily monitored on such a channel. The precursor consists of a dotting sequence (30 bits), a barker code (11 bit word sync) and a color code (7 bits). The transmission time for one registration signal is approximately 80 ms.

The RVC carries mainly analog voice, except when the mobile terminal is "audited" by the base station over the forward voice channel (FVC). In this case, the mobile terminal is in the Waiting For Order mode and must confirm the order received on the FVC channel by replying with a "blank-and-burst" message. The order can be one of the following:

1. Alert (forces the phone to ring);
2. Release (forces the phone to drop the call);
3. Stop Alert;
4. Audit (confirms the message sent to the mobile);
5. Send Called-address;
6. Intercept;
7. Maintenance;
8. Change Power to Power level 0-to-7;
9. Directed Retry;
10. Registration (forces another registration on the RECC).

During this process the audio path is muted. The "blank-and-burst" message is primarily used for hand-offs and also for order confirmations requested by the Base Station. The message stream consists of a dotting sequence (101 bits), a barker code (11 bits) and several repeated words which are interleaved by a smaller dotting sequence (37 bits) and a barker code. Since the data message is controlled by individual network requests, a non-network integrated wireless location system would have difficulty monitoring the RVC, identifying the mobile subscriber, and determining its location.

Using Super-Resolution (SR) techniques often yields a result with higher resolution as shown by Dumont, L. R., et al., "Super-resolution of Multipath Channels in a Spread Spectrum Location System," IEE Electronic Letters, Vol. 30, No. 19, pp. 1583–1584 , Sep. 15, 1994. Unlike Stilp et al., U.S. Pat. No. 5,327,144 issued Jul. 5, 1994, which does not further process the correlation peak, this invention proposes using an inverse transform with a resolution greater than the Rayleigh resolution.

This proposed solution does not require the use of GPS to determine position at the cellular telephone, and requires no modification of the subscriber equipment. In this way, the technology would be compatible with all cellular telephones in current use. The location technology would instead be implemented by an overlay on the network. For fleet location, rather than using radio tags, a better concept is to design new cellular telephones in which the radio section and the signal processing section are separate from the speech section and are actually mounted inside the vehicle with the speech section being removable so as not to arouse any suspicion. Such a system does not require any new infrastructure and may be implemented immediately with national coverage. Any fleet or organization with Cellular Digital Packet Data (CDPD) installed may use the invention for tracking wireless transceivers.

Therefore, this invention presents a TDOA-based wireless location system which has the primary task to solve either for (x,y,z), the three-dimensional location information of a Wireless Transceiver (WT) or for (x,y), the latitude and longitude of a WT. In order for the location system to solve for three unknowns, it requires a minimum of four (independent) equations (since the time of transmission 't0' is unknown as well). In order for the location system to solve for two unknowns, it requires a minimum of three (independent) equations.Each one of the (independent) equations can be formed by an independent Monitoring Station (MS) which produces a TOA estimate of the transmitted radio signal. All the TOA estimates are then collected at a Central Site (CS) to be used for solving for the unknowns through Hyperbolic (differential) Trilateration. The time required for reaching an initial location estimate of the mobile terminal consists of three main parts:

Step 1) the time required for monitoring the transmitted radio signal on either the RECC channel or the RVC channel, followed by the time for processing the received signal in order to estimate its TOA relative to a time reference; (an appropriate time reference could be the GPS Time);

Step 2) the time required for downloading each TOA estimate from its corresponding Monitoring Station (MS) to a central site, followed by the time for processing all TOA estimates through hyperbolic (differential) trilateration in order to estimate the location of the mobile terminal; (an appropriate central site could be the Mobile Switching Center (MSC) and an appropriate trilateration method could be least squares-based);

Step 3) the time required for overlaying the mobile subscriber's geographical location with individual Public Safety Answering Point (PSAP) coverage regions for determining appropriate PSAP routing.

One advantage of such a system is when positioning cellular telephones the proposed system requires no modification of the wireless telephone, no modification of the signal standards between telephone and cell site, and a minimal impact on the network. Positioning uses signals transmitted by the cellular telephone on either the RECC channel or the RVC channel. These signals are first correlated (either in time or in frequency) in order to achieve a coarse resolution of the Time of Arrival (TOA) of the transmitted signal at each cell site. Then, using Super-Resolution techniques such as MUSIC (MUltiple Signal Identification and Classification) a much finer resolution of the TOA can be achieved. TOA will be measured at various MSs whose precise positions are known. GPS receivers located at the cell sites and running in time transfer mode will provide time synchronization. Hyperbolic trilateration is then performed to estimate either the three-dimensional position (x,y,z) of the Cellular Telephone (CT) or its latitude and longitude (x,y).

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In the description that follows, all cited references are hereby incorporated by reference in this patent document.

Figure 1:
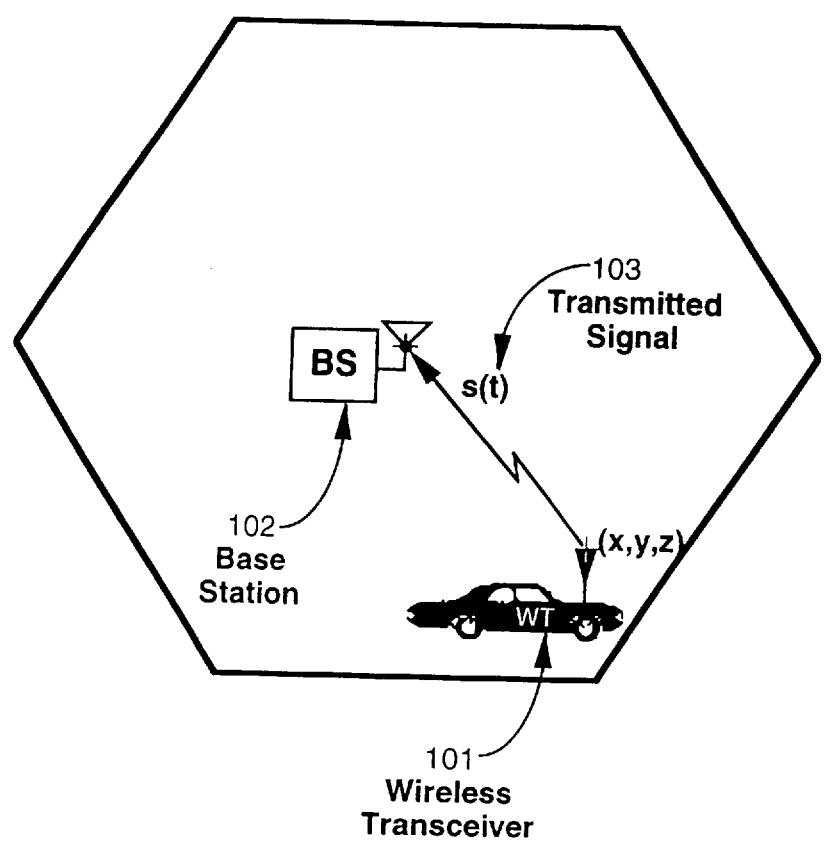
FIG. 1 is a schematic showing a Wireless Transceiver (WT) in a cell that transmits a radio signal s(t). If the WT is an AMPs-based Cellular Telephone (CT), it transmits a signal either in the form of a registration over the RECC channel or in the form of a blank-and-burst signal over the RVC channel. In either case, the transmission is intended for the BS with the most suitable RSSI.

FIG. 1 illustrates the Transmission by a WT (101) of a radio Transmitted Signal s(t) (103). When the WT is an AMPs-based Cellular Telephone (CT), it transmits a signal either in the form of a registration over the RECC channel or in the form of a blank-and-burst signal over the RVC channel. In either cases, the transmission is intended for the BS (102) with the most suitable RSSI.

Figure 2:
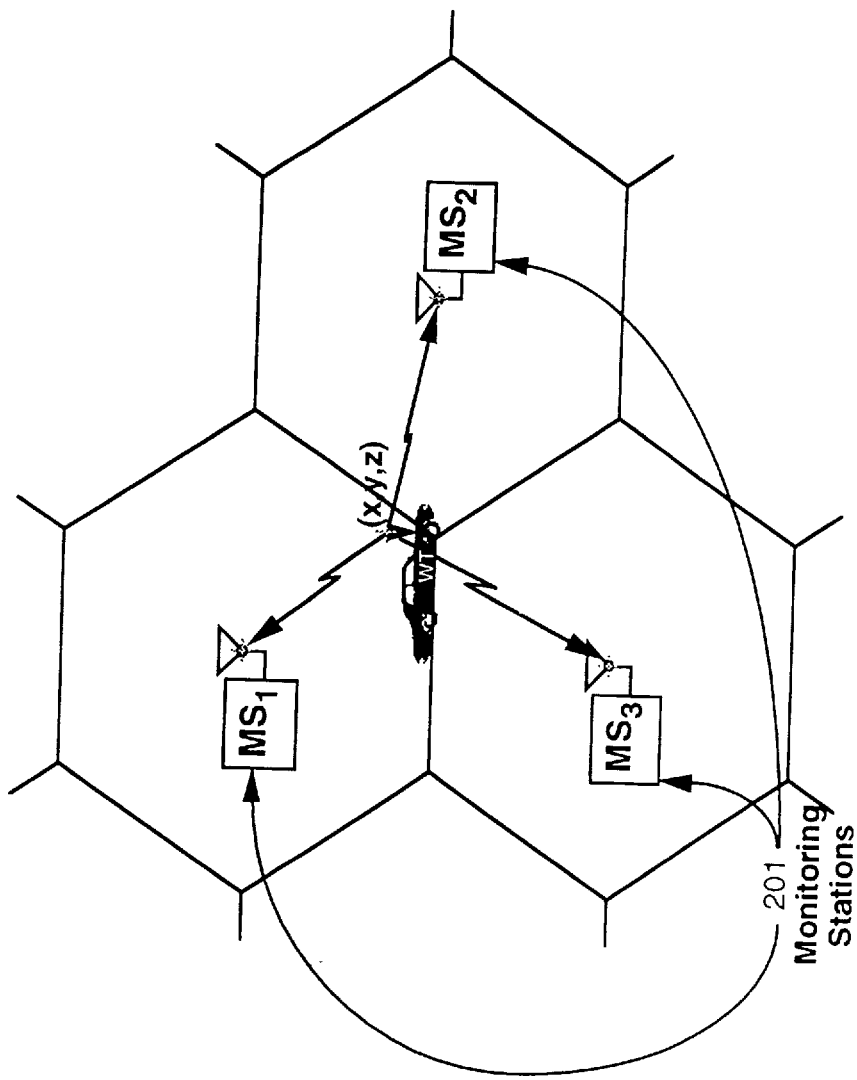
FIG. 2 is a schematic showing location of a WT in relation to several monitoring stations MS1, MS2, MS3. The signal transmitted by the WT is monitored by a number of MSs. In the case when the WT is an AMPs-based Cellular Telephone, either its registration on the RECC or its blank-and-burst on the RVC are monitored by the intended BS in addition to a number of other MSs. A minimum of four MSs are required to be able to solve for the three unknowns (x,y,z).
Figure 9:
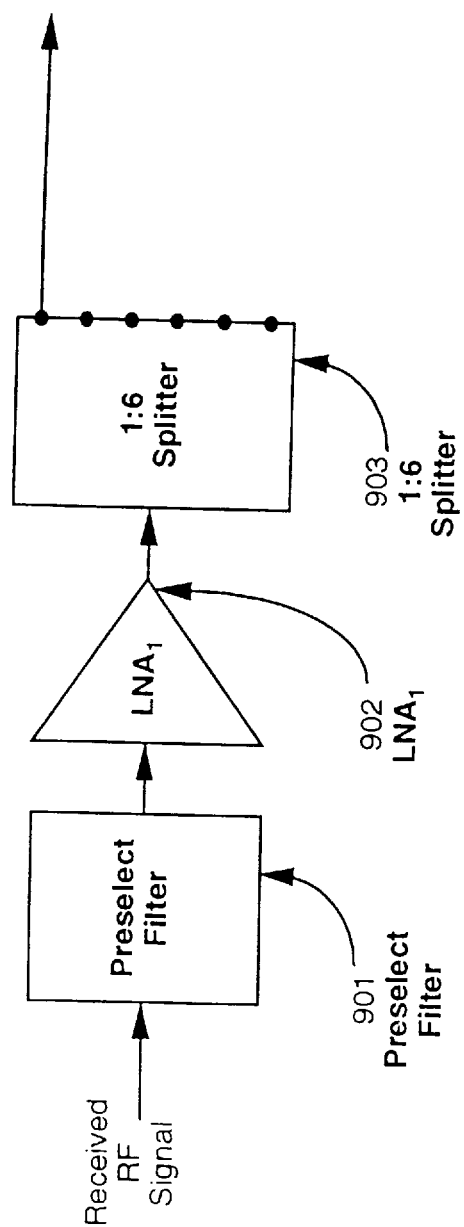
FIG. 9 is a schematic showing the components of the Receiver Multicoupler (801) in FIG. 8 in the case when the WT to be located is an AMPs-based Cellular Telephone.

Following FIG. 1, FIG. 2 illustrates the Reception of the signal transmitted by the WT by a number of Monitoring Stations (MSs) (201). When the WT is an AMPs-based CT, either its registration on the RECC channel or its blank-and-burst on the RVC are monitored by the intended BS and by a number of MSs as well. A minimum of four MSs are required to be able to solve for the three unknowns (x,y,z). In this case, it is possible to take advantage of the cellular infrastructure by locating the MSs at the BS sites, thereby using their:

1. high gain antennas with good RF coverage and appropriate RF front end (as shown in FIG. 9),
2. high speed link to the Mobile Switching Center (MSC) using either a T1-Link or a wired telephone link, and
3. convenient weather-proof temperature-regulated housing with power outlet.

Figure 3:
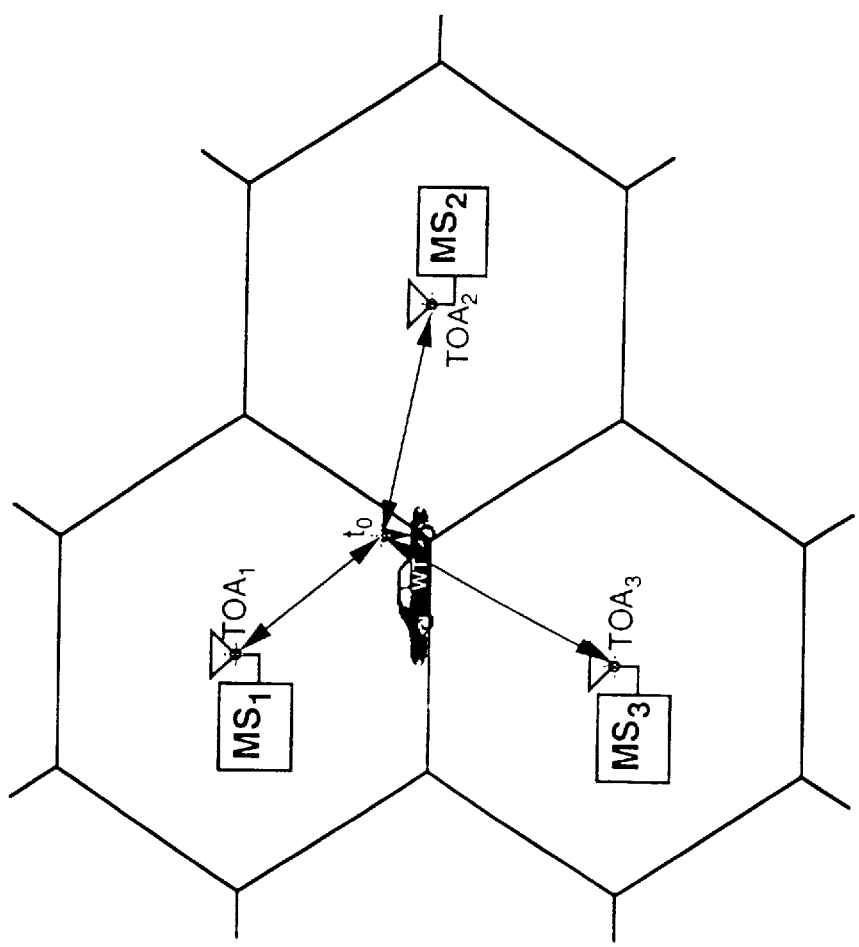
FIG. 3 is a schematic showing temporal relation of signals transmitted by the WT. The signal is transmitted by the WT at time 'to' and received at the ith MS at time 'TOA1'. Each MS processes the received signal using the receiver in FIG. 7 in order to estimate its TOA with a fine resolution.

FIG. 3 illustrates the Time of Transmission '$t_o$' and the ith Time of Arrival $TOA_i$ of the signal transmitted by the WT and received by the ith MS. The ith MS processes the received signal using the receiver in FIG. 7 in order to estimate its corresponding $TOA_i$ with a fine resolution.

Figure 4:
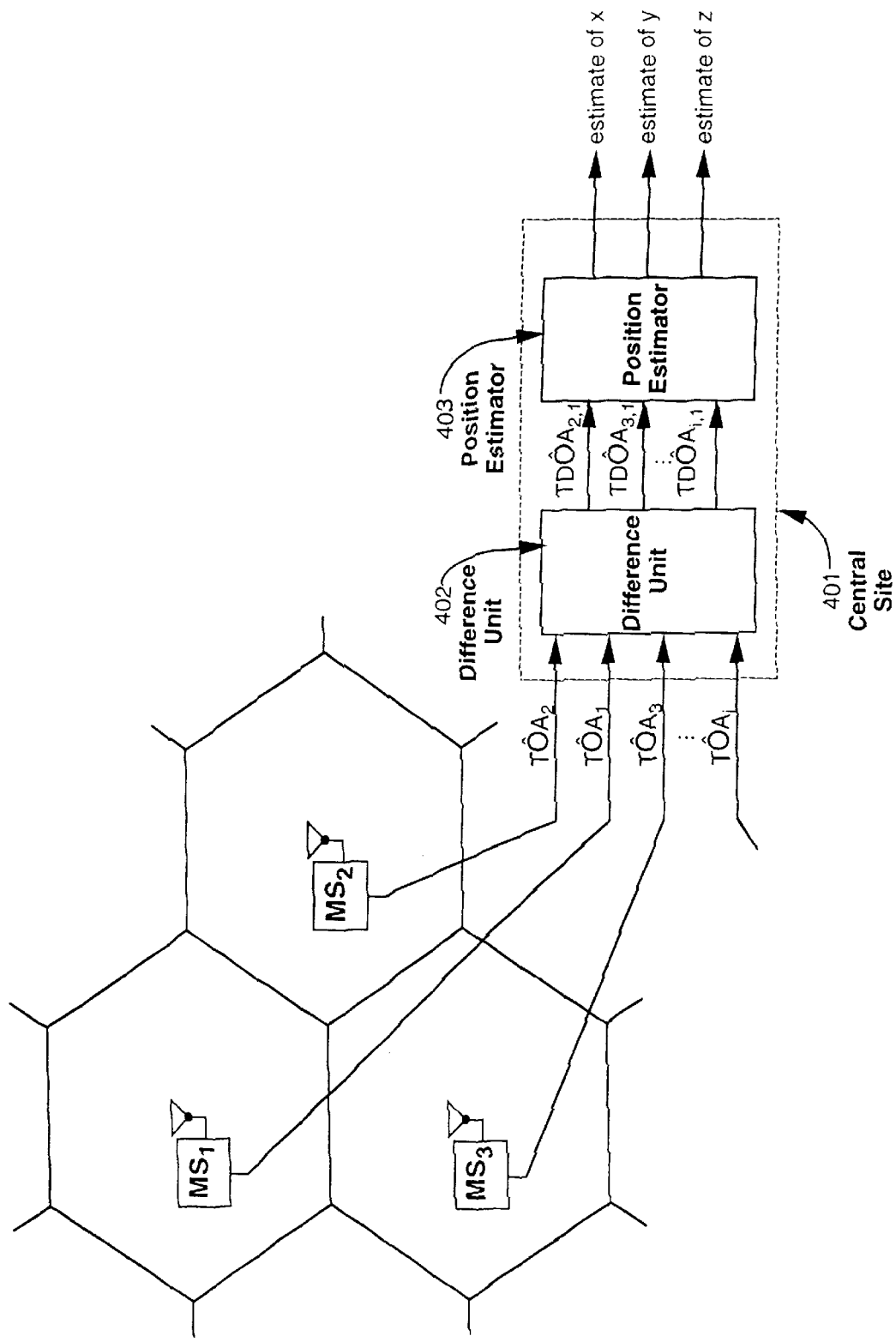
FIG. 4 is a schematic showing the relation of each monitoring station to a central site. Each MS down-loads its fine resolution TOA information to a Central Site (CS) which uses it to solve for the coordinates (x,y,z) of the WT using TDOA-based Hyperbolic Trilateration as explained in FIGS. 5 and 6.

FIG. 4 illustrates the Second Stage of the Wireless location system where the ith MS down-loads it's fine resolution estimate $T\hat{O}A_i$ of $TOA_i$ to a CS (401). The CS consists of three blocks:

The first block is a Difference Unit (402) which generates the estimated Time Difference of Arrival ($T\hat{DO}A_{i,1}$) between $T\hat{O}A_i$ and a chosen $T\hat{O}A_1$.

Figure 5:
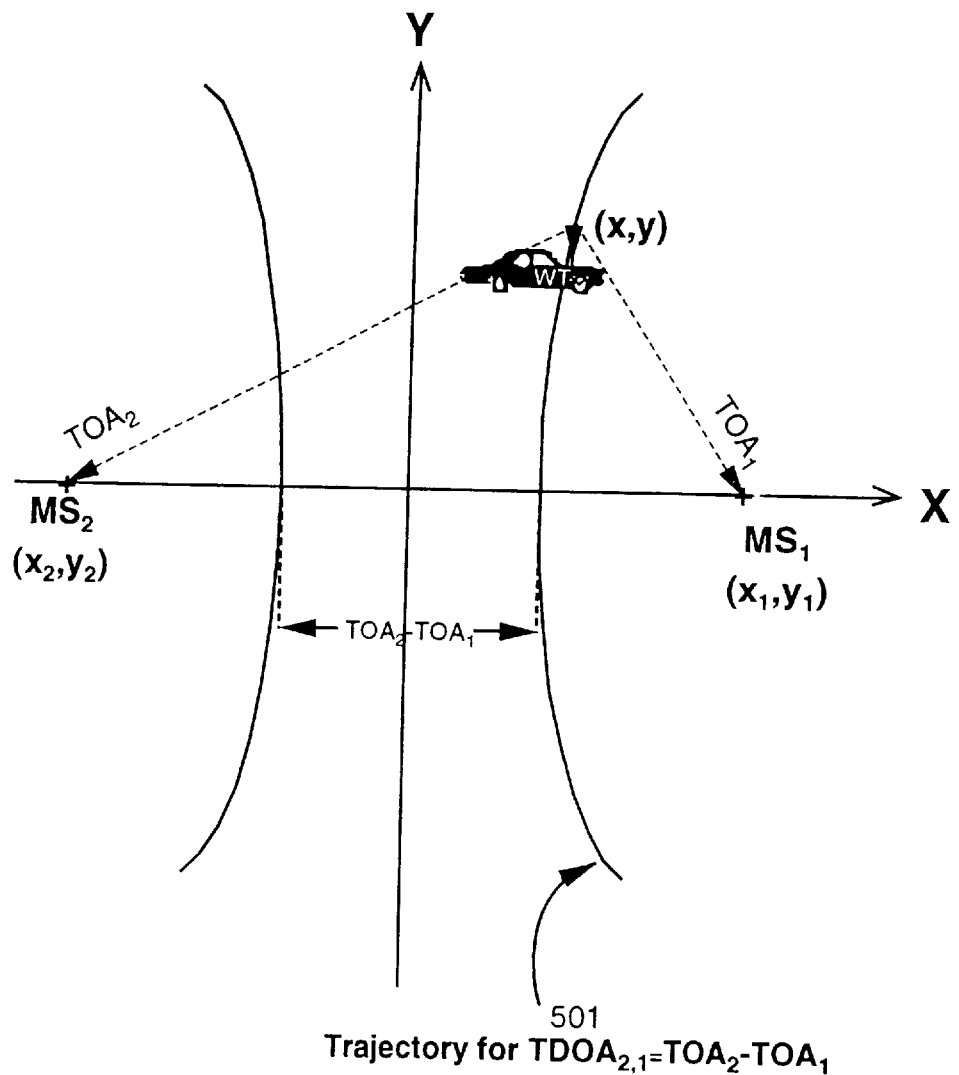
FIG. 5 is a schematic showing how a wireless transceiver is located from two TOA. Using two TOAs one can find the two-dimensional locus (trajectory) of points (which correspond to a unique TDOA) where the WT could be located.

The second block is a Position Estimator (403) which uses all the $T\hat{DO}A_{i,1}$ estimates to solve for the coordinates (x,y,z) of the WT using TDOA-based Hyperbolic Trilateration (as shown in Turin, G. L. et al., "A Statistical Model of Urban Multipath Propagation," IEEE Transactions on Vehicular Technology, Vol. VT-21, No. 1, February 1972) as explained in FIGS. 5 and 6. Without loss of generality, FIG. 5 illustrates the two-dimensional (horizontal) Trajectory for $TDOA_{2,1}$ which is defined as $$TDOA_{2,1} = TOA_2 - TOA_1$$
$$= (TOA_2 - t_0) - (TOA_1 - t_0)$$
$$= \frac{1}{c}\sqrt{(x_2-x)^2 + (y_2-y)^2}$$
$$- \frac{1}{c}\sqrt{(x_1-x)^2 + (y_1-y)^2}$$

where c is the speed of propagation, $(x_1,y_1)$ are the horizontal coordinates of $MS_1$ and $(X_2,y_2)$ are the horizontal coordinates of $MS_2$. In the case where three-dimensional coordinates of the WT are required we have to solve for (x,y,z) using $$TDOA_{2,1} = TOA_2 - TOA_1$$
$$= (TOA_2 - t_0) - (TOA_1 - t_0)$$
$$= \frac{1}{c}\sqrt{(x_2-x)^2 + (y_2-y)^2 + (z_2-z)^2}$$
$$- \frac{1}{c}\sqrt{(x_1-x)^2 + (y_1-y)^2 + (z_1-z)^2}$$

where $(x_1,y_1,z_1)$ are the coordinates of $MS_1$ and $(x_2,y_2,z_2)$ are the coordinates of $MS_2$.

Figure 6:
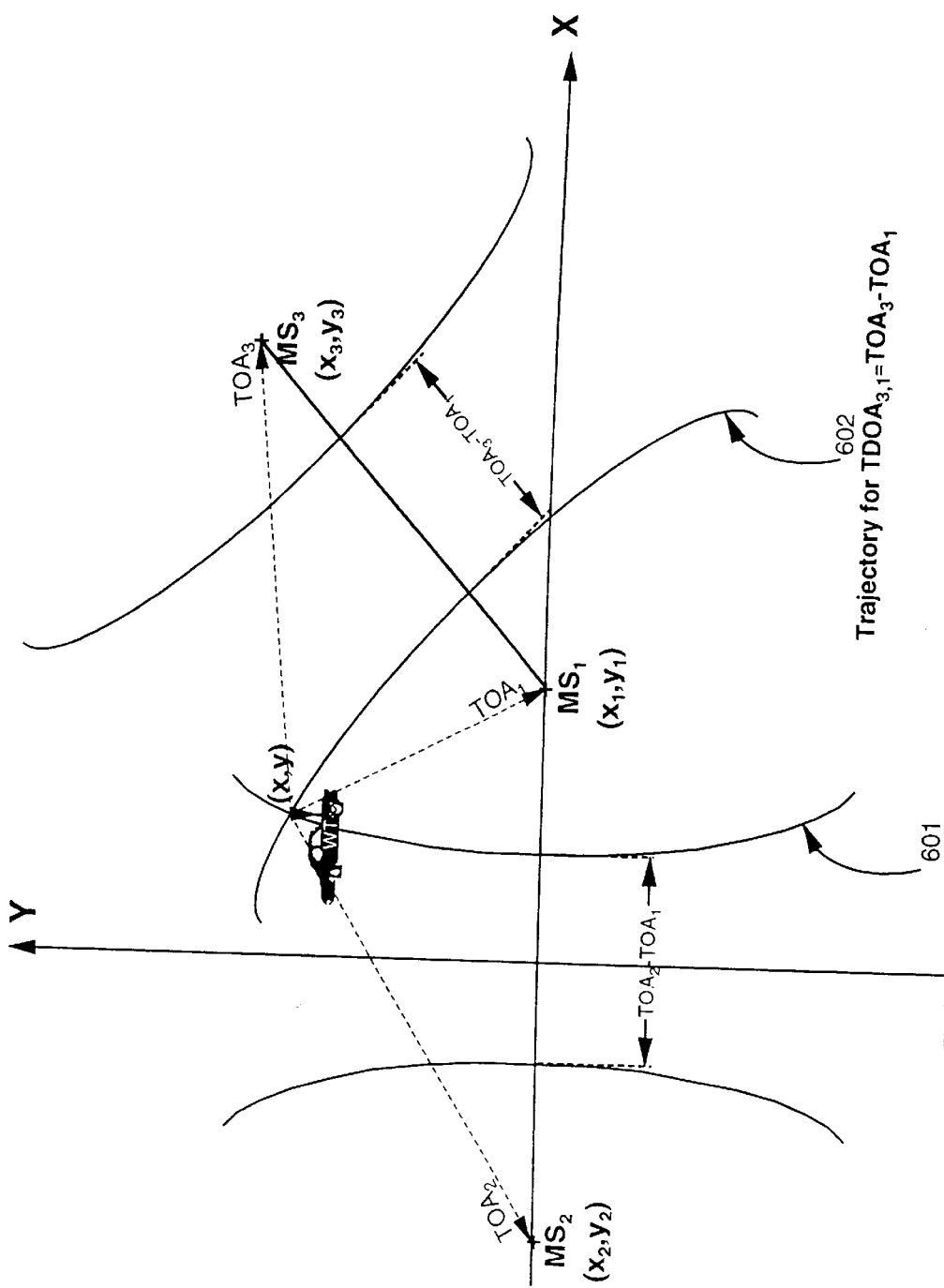
FIG. 6 is a schematic illustrating location of a wireless transceiver using hyperbolic trilateration. With three TOAs one can estimate the coordinates (x,y) of the WT as the intersection of the two locili (not to scale) each corresponding to a TDOA that is independent from the other TDOA.

Without loss of generality, FIG. 6 illustrates the two intersecting Trajectories for the two-dimensional coordinates (x,y) of the WT based on $TDOA_{2,1}$ and $TDOA_{3,1}$. In other words, it is possible to solve for (x,y) as the intersection between the two trajectories obtained using three TOAs. In order to solve for (x,y,z) we require four TOAs.

Figure 7:
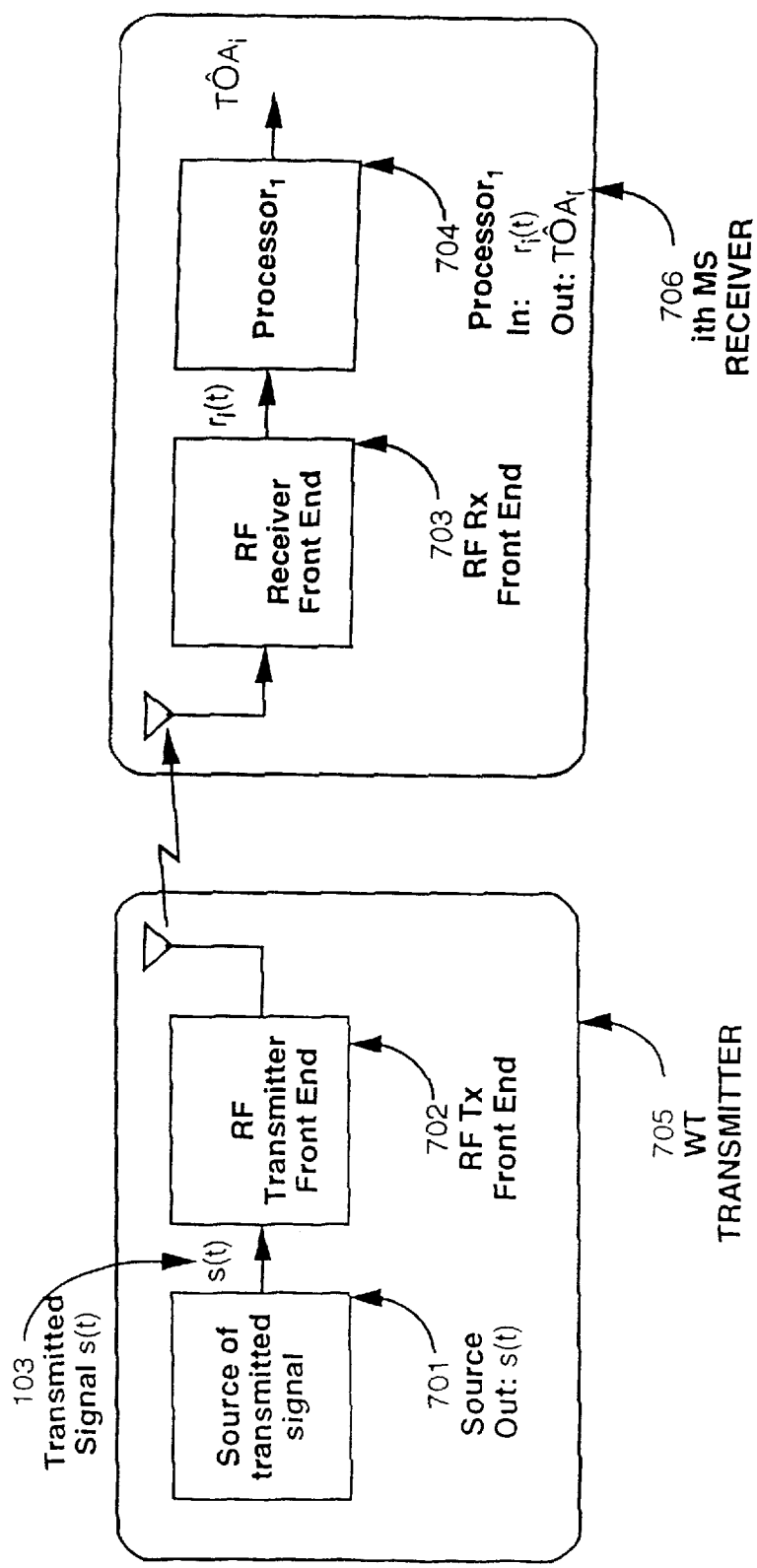
FIG. 7 is a schematic showing the components of the transmitter in the WT and the receiver in the ith MS.

FIG. 7 illustrates a typical WT Transmitter (705) and a typical ith MS Receiver (706). FIG. 7 is described as four blocks where the first two blocks are contained in the transmitter of the WT and the last two blocks are contained in the receiver of the ith MS. The blocks are described as follows:

The first block (701) in FIG. 7 is a Source of the signal s(t) (103) transmitted by the WT.

The second block (702) is the RF Transmitter Front End which takes s(t) and generates an RF signal for transmission.

The third block (703) is the RF Receiver Front End which receives the RF signal and generates $r_i(t)$ which is a distorted delayed replica of s(t). The delay is directly related to the propagation time between WT and MS. Such a block is explained further in FIG. 8.

The fourth block (704) is the Processor$_1$ which receives $r_i(t)$ and generates an estimate $T\hat{O}A_i$ of the TOA of the transmitted signal at the ith MS. Such a block is explained further in FIG. 11.

Figure 8:
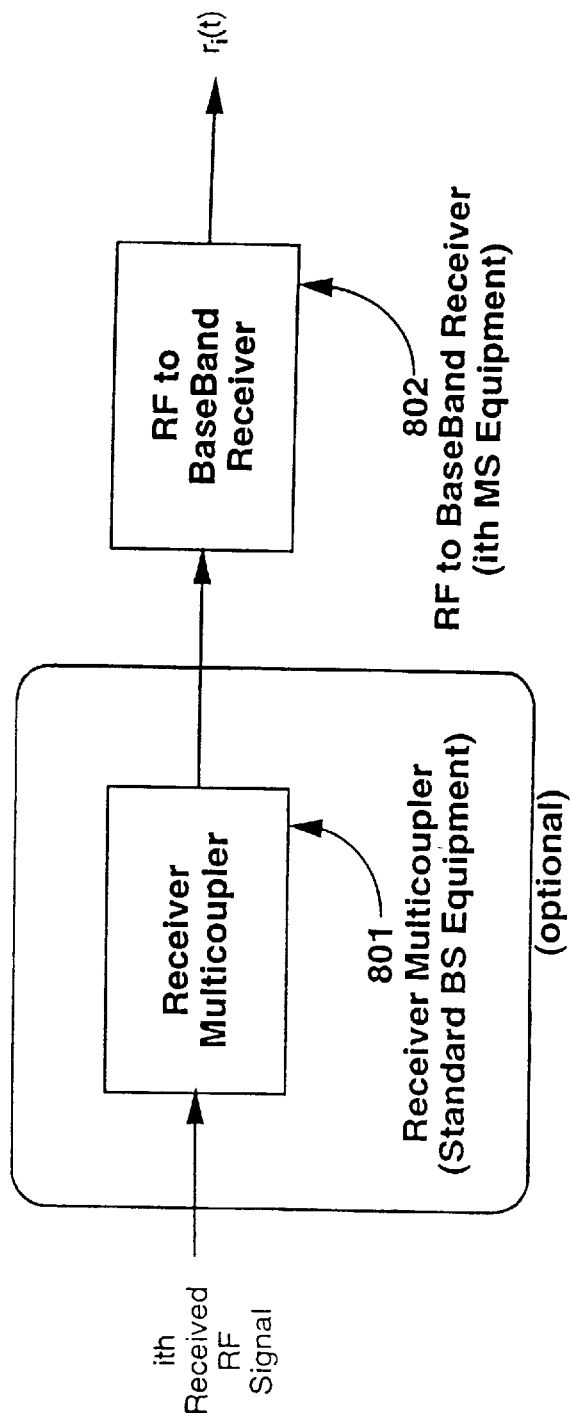
FIG. 8 is a schematic showing the components of the RF receiver Front End (703) in FIG. 7 in the MS. In the case where the WT to be located is an AMPS-based Cellular Telephone, the MS could be located in the BS site and the receiver multicoupler could be used by the MS.

FIG. 8 illustrates the RF Receiver Front End (703) in FIG. 7 as two blocks:

The first block (801) is an optional Receiver Multicoupler (which is a standard BS equipment) in case the WT is an AMPs-base CT and in case the MS is located at the BS site. This is one of the three advantages mentioned above regarding using the cellular infrastructure. Such a block is explained further in FIG. 9.

The second block is an RF-to-BaseBand (BB) Receiver (which belongs to each MS). Such a block is explained further in FIG. 10.

FIG. 9 illustrates the Receiver Multicoupler (801) in FIG. 8 as three blocks. As mentioned above such a block is optional in case the MS is located at the BS site and in case the MS uses the BS antenna; (in some cases it is not recommended to use the BS antenna such as when the cell is sectorized and the BS antenna covers only one sector).

The first block (901) is a Preselect Filter (with a large bandwidth such as 25 MHz) to remove any adjacent channel interference.

The second block (902) is a Low Noise Amplifier ($LNA_1$) to amplify the filtered signal before allowing too much noise to contaminate it due to the attenuation in the splitter (903) that follows.

The third block (903) is a 1:6 Splitter which splits the signal into 6 equal parts thereby attenuating the power of the signal by a factor of 6.

Figure 10:
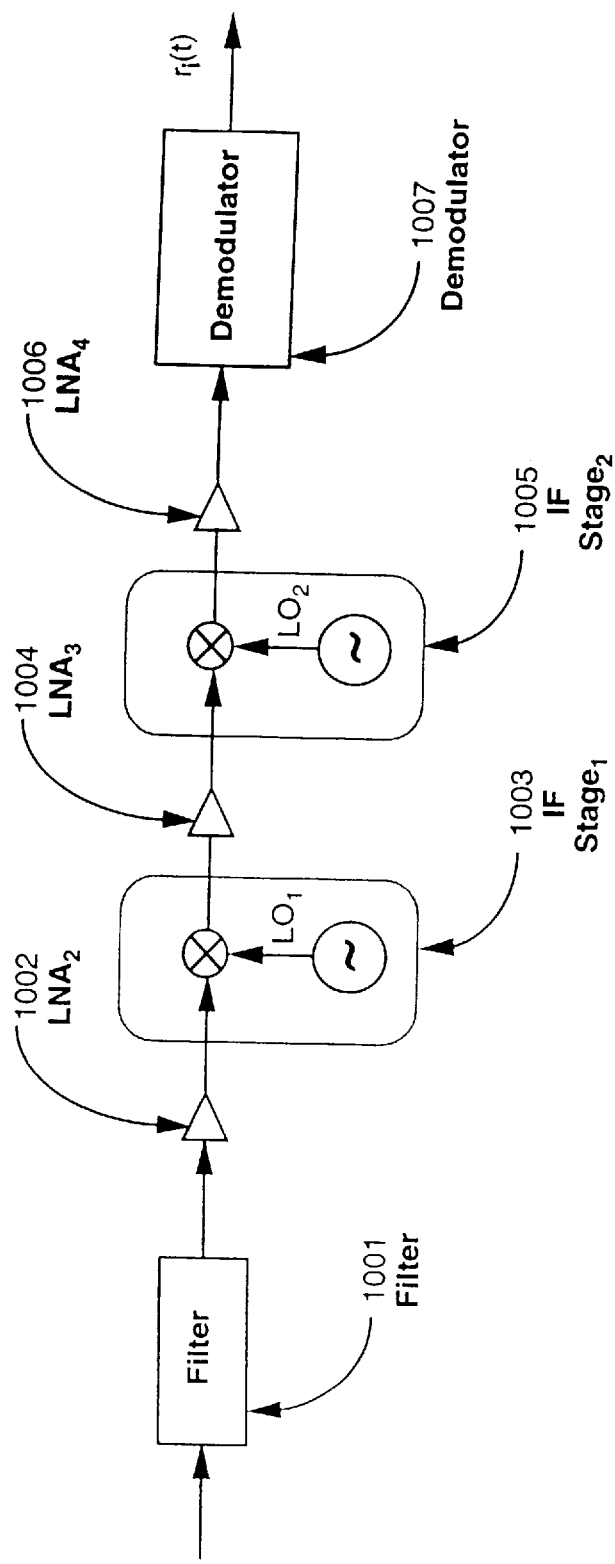
FIG. 10 is a schematic showing the components of the RF to BaseBand Receiver (802) in FIG. 8.

FIG. 10 illustrates the RF-to-BB Receiver (802) in FIG. 8 as two IF stages. In some cases the RF-to-BB receiver is designed with only one IF stage or even with no IF (also known as zero IF receiver or direct conversion receiver). The RF-to-BB receiver with two IF stages consists of a number of blocks as shown in FIG. 10:

The first block (1001) is a Filter which filters the undesired signals from the desired one.

The second block, $LNA_2$, (1002) is a Low Noise Amplifier which performs a first stage amplification.

The first block, IF stage$_1$, (1003) is a down-converter stage using a mixer and a Local Oscillator ($LO_1$) set at a first Intermediate Frequency ($IF_1$).

The second block, $LNA_3$, (1004) is a Low Noise Amplifier which performs a second stage amplification.

The third block, IF stage$_2$, (1005) is a down-converter stage using a mixer and a Local Oscillator (LO) set at a second Intermediate Frequency ($IF_2$).

The fourth block, $LNA_4$, (1006) is a Low Noise Amplifier which performs a third stage amplification.

The fifth block (1007) is a demodulator which converts the second IF signal into a BB signal for further processing by Processor$_1$ (704).

Figure 11:
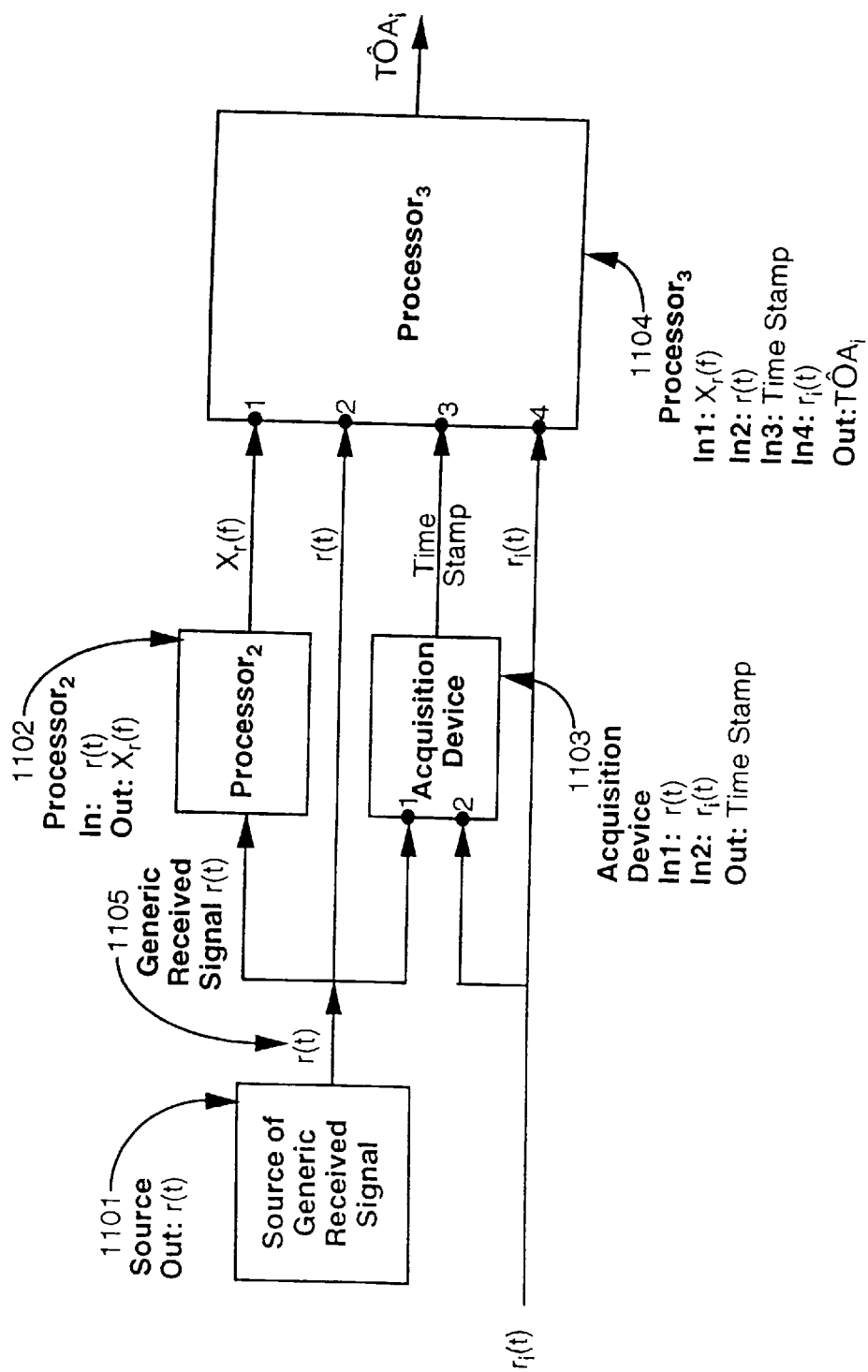
FIG. 11 is a schematic showing the components of Processor1 (704) in FIG. 7 in the receiver of the ith MS.

FIG. 11 illustrates Processor$_1$ (704) in FIG. 7 which receives $r_i$ (t) and generates $T\hat{O}A_i$. Processor$_1$ consists of four blocks:

The first block (1101) is a Source of the Generic Received Signal r(t) (1105). It can be either a signal generator or a look-up table. The Generic Received Signal r(t) (1105) corresponds to $r_i(t)$ under ideal conditions, i.e. when the Transmitted Signal s(t) (103) is transmitted over the RF Transmitter Front End (702), an ideal channel whose impulse response is a Dirac-delta function d(t) located at the origin (i.e. without dispersion, propagation delay, distortion or noise) and received using the RF Receiver Front End (703).

The second block (1102) is Processor$_2$ which receives r(t) (1105) and generates its Power Spectral Density (PSD) '$X_r(f)$'. Processor$_2$ is further explained in FIG. 12.

The third block (1103) is Acquisition Device which receives two inputs and generates a Time Stamp. The two inputs are: the Generic Received Signal r(t) (1105) and the received signal $r_i(t)$ at the ith MS. The Acquisition Device (1103) is further explained in FIG. 13.

The fourth block (1104) is Processor$_3$ which receives four inputs and generates $T\hat{O}A_i$. The four inputs are: the PSD $X_r(f)$ of r(t) (1105) output from Processor$_2$ (1102), the Generic Received Signal r(t) (1105) output from Source (1101), the time stamp output from the Acquisition Device (1103), and the received signal $r_i(t)$ at the ith MS. Processor$_3$ is further explained in FIG. 14.

Figure 12:
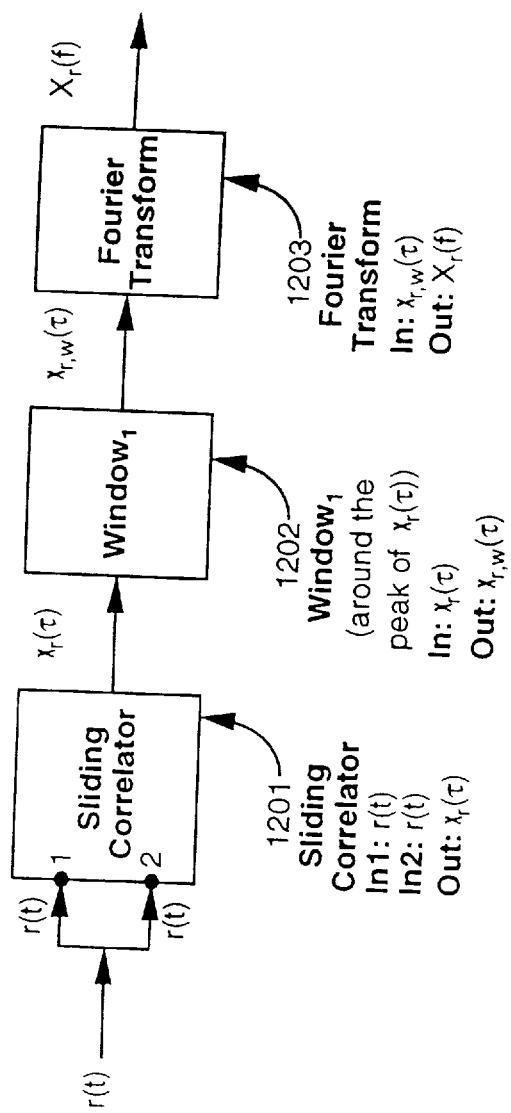
FIG. 12 is a schematic showing the components of Processor2 (1102) in FIG. 11.

FIG. 12 illustrates Processor$_2$ (1102) in FIG. 11 which receives r(t) (1105) and generates X$_r$(f). Processor$_2$ consists of three blocks:

The first block (1201) is a Sliding Correlator which has two inputs and an output that represents the cross correlation x$_r$(t) between its two inputs as a function of t, the relative delay between the two inputs. In FIG. 12, the two inputs to the sliding correlator are r(t) and its exact replica r(t).

The second block (1202) is a Window$_1$ which receives the cross-correlation x$_r$(t) and generates a windowed cross-correlation x$_{r,w}$(t) where an equal number of the sidelobes of x$_r$(t) have been removed on both sides of its main lobe. In other words, x$_{r,w}$(t) is symmetric around its main lobe.

The third block (1203) is a Fourier Transform which receives x$_{r,w}$(t) and generates X$_r$(f), the Fourier Transform of x$_{r,w}$(t). We refer to X$_r$(f) as the PSD of r(t).

One should note that Processor$_2$ (1102) does not have to generate X$_r$(f) in real time since its input r(t) is known a priori. Thus, its operations can be performed off-line.

Figure 13:
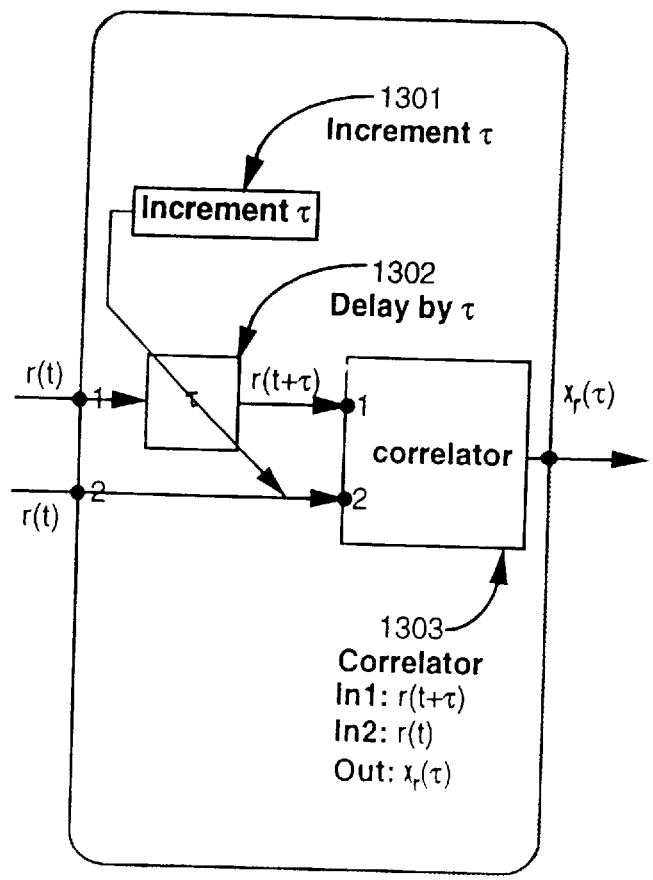
FIG. 13 is a schematic showing the components of Sliding Correlator (1201) in FIG. 12.

FIG. 13 illustrates the Sliding Correlator (1201) in FIG. 12. In general a sliding correlator receives two inputs and generates their cross-correlation as a function of the relative delay t between the two inputs. A Sliding correlator consists of three blocks:

The first block (1301) is a Counter which increments the delay t from a minimum value of zero to a maximum value of the duration of the Generic Received Signal r(t).

The second block (1302) is a delay element with two inputs and one output. The two inputs are r(t) and t and the output is r(t+t). In other words, the delay element simply delays the first input r(t) by the second input t to generate r(t+t).

The third block (1303) is a Correlator which receives two inputs and generates their correlation.

Figure 14:
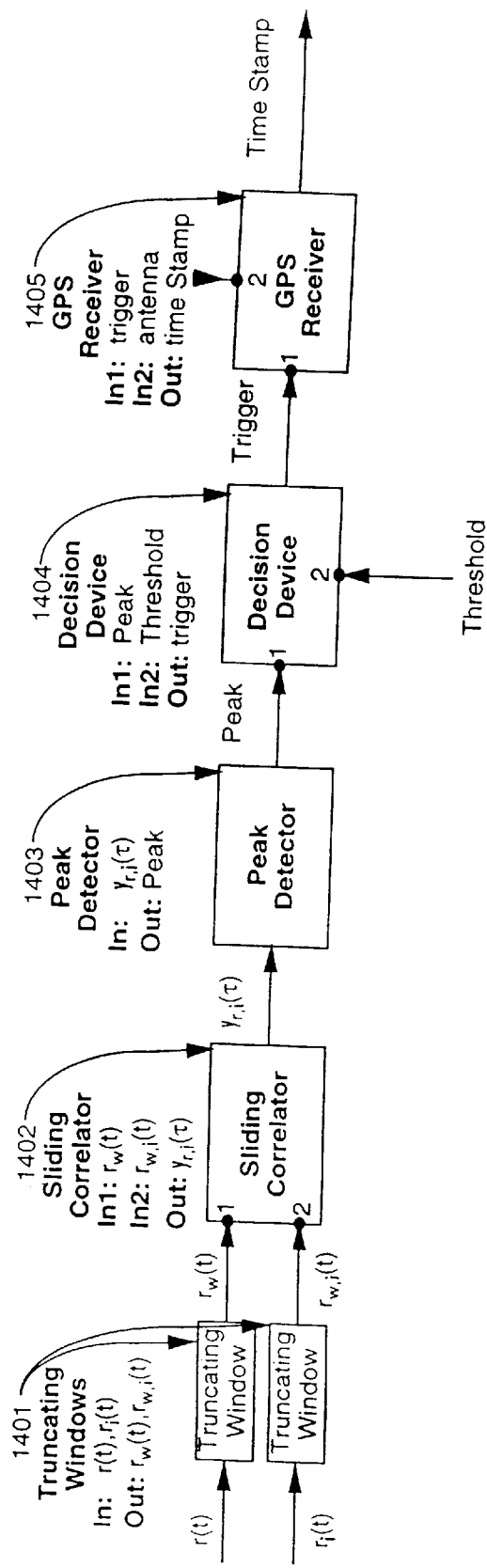
FIG. 14 is a schematic showing the components of Acquisition Device (1103) in FIG. 11.
Figure 15:
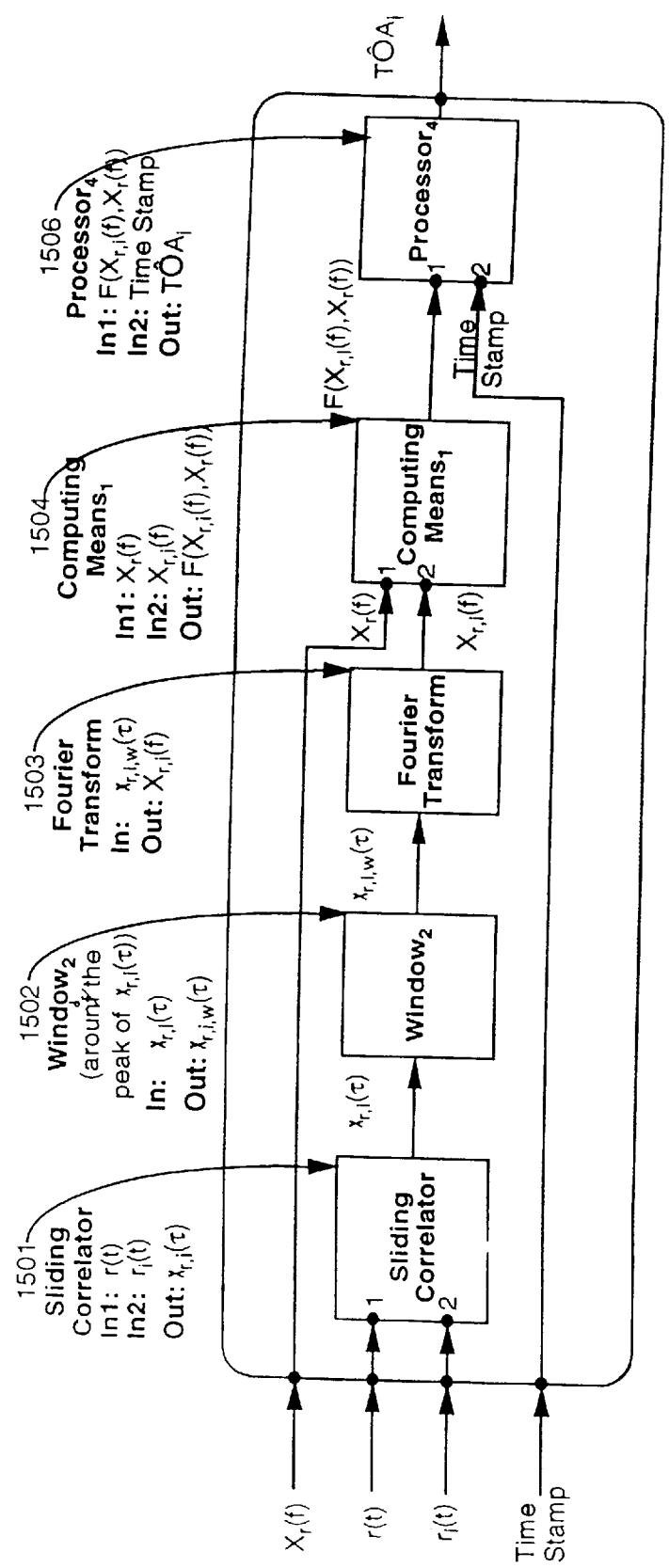
FIG. 15 is a schematic showing the components of the Processor3 (1104) in FIG. 11.

In FIG. 12 the two inputs to the sliding correlator are r(t) and its exact replica r(t), i.e. x$_r$(t) is in fact the autocorrelation of r(t). In FIGS. 14 and 15 below, we use a Sliding Correlator where the two inputs are different.

FIG. 14 illustrates the Acquisition Device (1103) in FIG. 11 which receives two inputs and generate a Time Stamp. The two inputs are r(t) and r$_i$(t). The Acquisition Device consists of five blocks:

The first block is a set of two Truncating Windows (1401) which truncate r(t) and r$_i$(t) independently to produce r$_w$(t) and r$_{w,i}$(t) respectively. The reason for the Truncating Windows (1401) is to reduce the complexity of the Sliding Correlator (1402). A second Sliding Correlator (1501) takes place between the entire two signals r(t) and r$_i$(t) and provides a finer resolution than the one offered by Sliding Correlator (1402).

The second block is a Sliding Correlator (1402) similar to the one described in FIG. 13 except its two inputs are r$_w$(t) and r$_{w,i}$(t) and its output is y$_{r,i}$(t). In other words, y$_{r,i}$(t) is the cross-correlation between r$_w$(t) and r$_{w,i}$(t) as a function of the delay t between the two functions.

The third block is a Peak Detector (1403) which receives the cross-correlation y$_{r,i}$(t) and generates a Peak corresponding to the delay t where y$_{r,i}$(t) reaches its peak.

The fourth block is a Decision Device (1404) which receives the Magnitude of the Peak and generates a Trigger signal corresponding to the delay t where y$_{r,i}$(t) reaches its peak and when the Magnitude of the Peak exceeds a set Threshold.

The fifth block is a GPS Receiver (1405) which gets a Trigger signal from Decision Device (1404) and generates a Time Stamp to be used for final processing of TÔA$_i$.

It is possible to use only a portion of r$_i$(t) as the second input in Acquisition Device (1103) such as the Barker code in the RECC in the AMPs system.

FIG. 15 illustrates Processor3 (1104) in FIG. 11 which receives four inputs and generates an estimate TÔA$_i$ of TOA$_i$. The four inputs are the PSD X$_r$(f) from Processor$_2$ (1102), the Generic Received Signal r(t) from Source (1101), the ith received signal r$_i$(t) and the Time Stamp generated by the Acquisition Device (1103). Processor$_3$ consists of five blocks:

The first block is a Sliding Correlator (1501) similar to the one described in FIG. 13 except its two inputs are r(t) and r$_i$(t) and its output is x$_{r,i}$(t). In other words, x$_{r,i}$(t) is the cross-correlation between r(t) and r$_i$(t) as a function of the relative delay t between the two functions. One can combine the Sliding Correlator (1402) in FIG. 14 with the Sliding Correlator (1501) in FIG. 15 when they have the same inputs and the same output.

The second block (1502) is a Window$_2$ which is identical to Window$_1$ (1202) in FIG. 12 in the sense that it receives a cross-correlation and generates a windowed cross-correlation with an equal number of sidelobes on both sides of its main lobe. The number of sidelobes removed by Window$_2$ (1502) is identical to the number of sidelobes removed by Window$_1$ (1202). The duration of Window$_2$ (1502) is identical to the duration of Window$_1$ (1202), it is centered around the peak of x$_{r,i}$(t) similar to Window$_1$ (1202) and has the same shape as Window$_1$ (1202). In FIG. 15, Window$_2$ (1502) receives the cross-correlation x$_{r,i}$(t) and generates the windowed cross-correlation x$_{r,i,w}$(t).

The third block (1503) is a Fourier Transform (once again identical to the Fourier Transform (1203) in FIG. 12) which receives x$_{r,i,w}$(t) and generates X$_{r,i}$(f), the Fourier Transform of x$_{r,i,w}$(t).

The fourth block (1504) is Computing Means$_1$ which receives two inputs and generates a function of the two inputs in terms of frequency 'f'. The two inputs are: X$_r$(f) and X$_{r,i}$(f), and the output of Computing Means$_1$ is F(X$_{r,i}$(f),X$_r$(f)) which is a function of X$_r$(f) and X$_{r,i}$(f).

The fifth block is Processor$_4$ (1505) which receives two inputs and generates the estimate TÔA$_i$ of TOA$_i$. The two inputs are: the function F(X$_{r,i}$(f),X$_r$(f)) generated by the Computing Means$_1$ (1504) and the Time Stamp generated by the Acquisition Device (1103) in FIG. 11. Processor$_4$ (1505) is further explained in FIG. 16.

Figure 16:
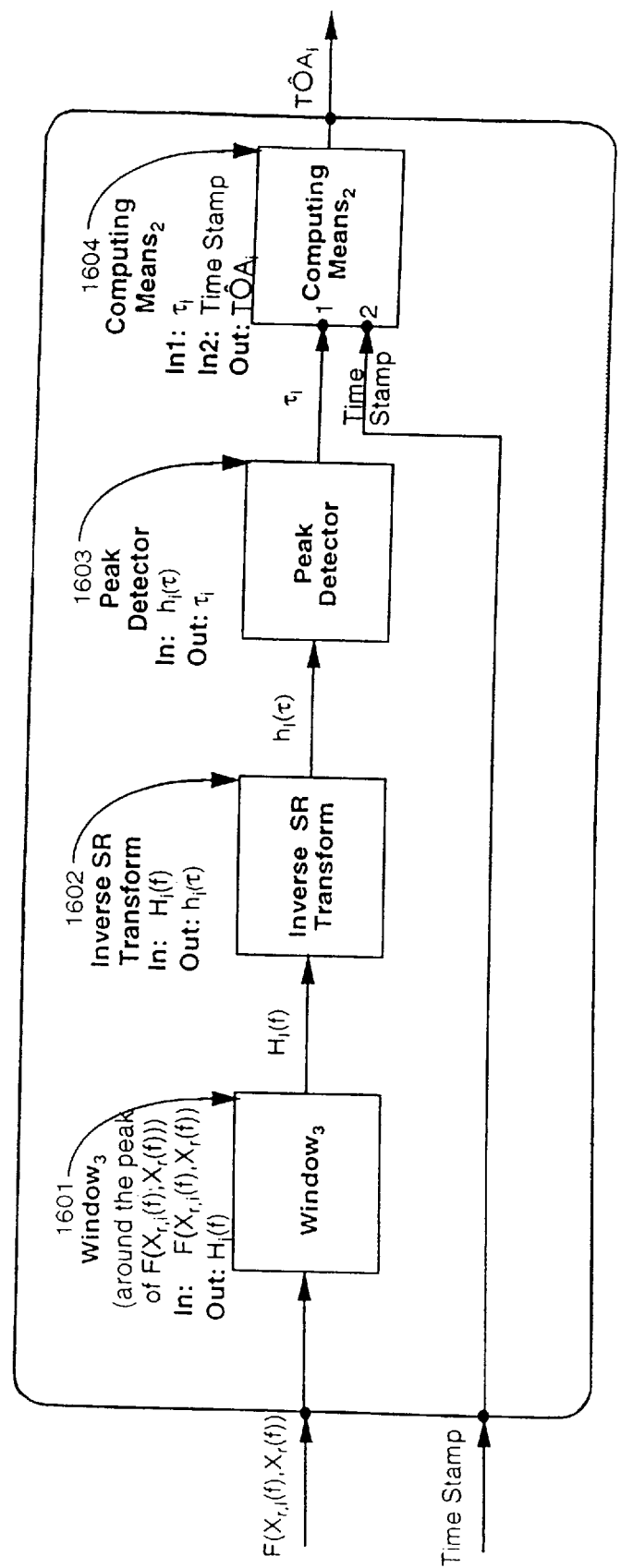
FIG. 16 is a schematic showing the components of the Processor4 (1506) in FIG. 15.

FIG. 16 illustrates Processor$_4$ (1505) in FIG. 15 with two inputs and one output. The two inputs are the function F(X$_{r,i}$(f),X$_r$(f)) generated by Computing Means$_1$ (1504) and the Time Stamp generated by the Acquisition Device (1103) in FIG. 11, while the output is the estimate TÔA$_i$ of TOA$_i$. Processor$_4$ consists of four blocks:

The first block (1601) is a Window$_3$ which is similar to Window$_1$ (1202) in FIG. 12 however in this case, it receives the function F(X$_{r,i}$(f),X$_r$(f)) generated by Computing Means$_1$ (1504) and generates H$_i$(f) which is a windowed version of F(X$_{r,i}$(f),X$_r$(f)) centered around the peak of F(X$_{r,i}$(f),X$_r$(f)) with an equal number of sidelobes on both sides of its main lobe. The number of sidelobes removed by Window$_3$ (1601) is not necessarily identical to the number of sidelobes removed by Window$_1$ (1202). Similarly, the shape of Window$_3$ (1601) is not necessarily identical to the shape of Window$_1$ (1202) One can think of H$_i$ (f) as the transfer function of the RF propagation channel used by r(t) to travel from the WT antenna to the antenna of the ith MS.

The second block (1602) is the Inverse Super-Resolution (SR) Transform which receives H$_i$ (f) and generates h$_i$ (t). One can think of h$_i$ (t) as the impulse response of the RF propagation channel used by r(t) to travel from the WT antenna to the antenna of the ith MS. Ideally, h$_i$ (t) should equal $$h_i(\tau)=\delta(\tau-(TOA_i-t_o))$$

where d(t) is Dirac-Delta and TOA$_i$ is the Time of Arrival at the ith MS.

The third block (1603) is a Peak Detector (similar to Peak Detector (1403) in FIG. 14) which receives the cross-correlation h$_i$(t) and generates a delay t$_i$ corresponding to the delay when h$_i$(t) reaches its peak.

The fourth block (1604) is Computing Means$_2$ which receives two inputs and generates the estimate TÔA$_i$ of TOA$_i$. The two inputs are: t$_i$ generated by the Peak Detector (1603) and the Time Stamp generated by the Acquisition Device (1103) in FIG. 11.

Figure 17:
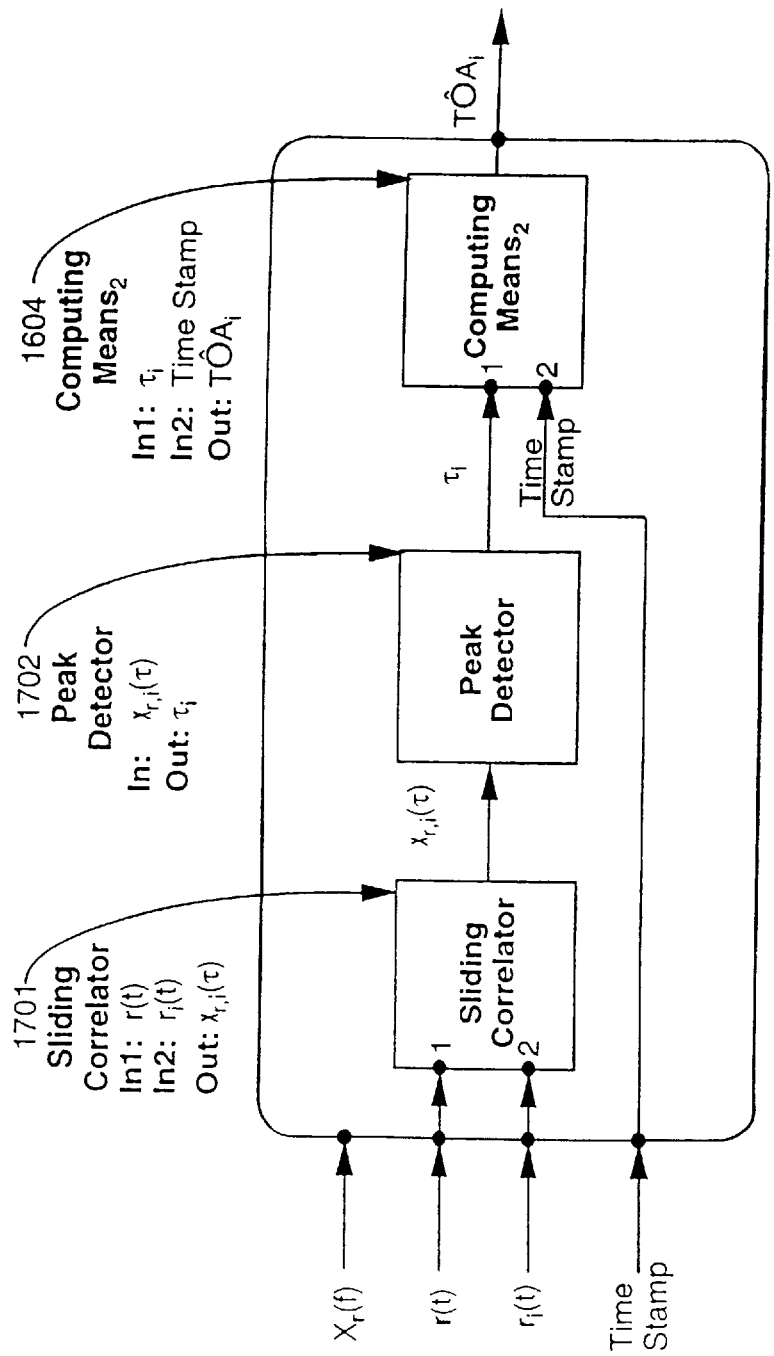
FIG. 17 is a schematic showing the components of the Conventional TOA estimator.

Definition of the Inverse SR Transform:

In this patent, we refer to the inverse SR transform as any transform which provides a TOA accuracy better than the conventional sliding correlator method illustrated in FIG. 17. All prior art has relied solely on the conventional sliding correlator method.

DESCRIPTION OF THE PREFERRED EMBODIMENTS OF THE INVENTION

Preferred Embodiment of the WT (101)

In FIG. 1, a preferred embodiment of the WT (101) is either a Wireless Telephone such as an AMPs-based CT, an IS-136 CT, an IS-95 CT, a GSM CT, a DECT CT, a CT2-Plus CT, an OmniPoint CT, a Cordless Telephone, a PCS Telephone, a Citizen Band (CB) Telephone, a Specialized Mobile Radio (SMR) Telephone, etc. or a radio tag. In FIG. 1, a preferred BS (102) is either the one corresponding to the telephones mentioned above or the RF radio tag reader.

Preferred Embodiment of the MS (201):

In FIG. 2, a preferred MS (201) is located at the BS site to take advantage of several benefits as mentioned above. However, in some cases it is not possible to access the BS site. In such cases, the MSs site are chosen to have good coverage and to have access to a Central Site through a communication link.

Preferred Geometry of the MSs:

In FIG. 3 a preferred geometry for the location of the MSs is one where the Horizontal Dilution of Precision (HDOP) is chosen $\leq 2$. In the case where the HDOP of the existing cellular infrastructure (i.e. the existing cellular BSs) is larger than 2, MSs can be placed in appropriate locations to achieve the required HDOP.

Preferred Transmitted Signal s(t) (103):

In FIG. 1 and 7 a preferred Transmitted Signal s(t) (103) depends on the WT to be located and on the method of monitoring: either passive or active. In case the WT is an AMPs-based CT and the MS is passive, s(t) can be the registration precursor over the RECC channel. The precursor consists of a 30 bit dotting sequence, an 11 bit Barker coded synchronization word, a 7 bit coded digital color code. It is transmitted by the cellular telephone on the Reverse Control Channel (RECC) whenever network access is required. Occasions for transmission are paging, call initiation and registration. In case the WT is an AMPs-based CT and the MS is active, s(t) can be the blank-and-burst signal over the RVC channel.

Another important factor in the choice of the Transmitted Signal s(t) (103) is the number of symbols contained in s(t) since the larger the number of symbols the higher the Signal-to-Noise Ratio (SNR) of the correlation function $x_{r,i}(t)$ between the two signals r(t) and r$_i$(t). A higher SNR achieves a finer resolution. For example, the precursor in the registration signal over the RECC channel consists of 48 symbols. On the other hand, the registration signal following the precursor represents an order of magnitude increase in the number of symbols contained in s(t) and therefore corresponds to an order of magnitude increase in SNR. The trade-off between a short signal s(t) and a long one is the complexity of Processor3 (1104). Moreover, unlike the precursor which is known to all MSs, the registration signal is usually unknown to the MSs, and hence can suffer from bit errors which can degrade the location accuracy of the WT.

A solution for the bit errors that can take place in the decoding of the registration signal is to perform a cross-correlation between each pair of received signals: r$_i$(t) and r$_j$(t) where i_j instead of performing a cross-correlation between each received signal r$_i$(t) and a generic signal. In this case, the cross-correlation between r$_i$(t) and r$_j$(t) can take place at the Central Site.

Another possible transmitted signal s(t) when the WT is an AMPs-based CT and the MS is passive is any one of the 21 possible RECC channels. In this case, one can monitor all 21 channels simultaneously or independently. When monitoring all 21 channels simultaneously, the received signal r$_i$(t) can correspond to more than one RECC transmission implying that an AGC is required prior to the A/D converter. An alternative design is to have an RF Receiver front end (703) per RECC channel, a multiplexer and a single Processor$_1$ for all channels.

Preferred Embodiment of the RF Receiver Front End (703):

In FIG. 8 a preferred embodiment of the RF Receiver Front End (703) is to use the Receiver Multicoupler (801) used by the BS. A preferred embodiment of the Receiver Multicoupler (801) is shown in FIG. 9.

Another preferred embodiment of the RF Receiver Front End (703) is to have a stand-alone MS with good antenna coverage housed in a weather-proof environment.

Preferred Embodiment of the RF to BB Receiver (802):

In FIG. 8 a preferred implementation of the RF-to-BB Receiver (802) is to use a software radio which consists of an RF board and a digital signal processor (DSP) (e.g. Hopper Plus, Wireless Ethernet Bridge, Product Specification, Wi-LAN Inc, Calgary, Alberta, Canada, 1996). The first task of the RF to BB Receiver (802) is to demodulate the signal. The modulation method used in AMPs is analog narrowband FM. The signal is demodulated as shown in FIG. 10. The RF to BB Receiver (802) is tuned to the RECC frequency or to the RVC frequency. The signal is down converted first to 45 MHz IF (1003) and then to 455 KHz (1005).

Another preferred implementation of the RF-to-BB Receiver (802) is to use a dedicated radio with the minimum number of required components to perform the various required tasks.

Preferred Embodiment of Demodulator (1007):

A preferred Demodulator (1007) is to demodulate the FM signal with a Phase Locked Loop (PLL). The PLL provides two outputs, the baseband signal $r_t(t)$ and a lock detect signal. The lock detect signal becomes active when the PLL has locked onto the received signal. The lock detect signal can be used by the Acquisition Device (1103) and by Processor$_3$ as an indicator to start processing the received signal $r_t(t)$.

Another preferred Demodulator (1007) is to use an In-phase and Quadrature demodulator (I&Q). The In-phase and Quadrature branches down convert the received signal $r_t(t)$ from RF to BB irrespective of the modulation used.

In case the I&Q demodulator is used to demodulate the received signal, the Generic Received Signal r(t) (1105) in FIG. 11 is equal to the transmitted signal s(t) (103).

In case the PLL demodulator is used to demodulate the received signal, the Generic Received Signal r(t) (1105) in FIG. 11 corresponds to the transmitted signal s(t) (103) demodulated using the PLL demodulator.

An important advantage of using the PLL over the I&Q demodulator is the fact that small frequency offsets in the Local Oscillator at each MS do not significantly degrade the TOA accuracy.

Preferred Processing of the Received Signal $r_t(t)$

A preferred processing of the received signal $r_t(t)$ in FIG. 11 is to sample it, then to quantize it using an Analog-to-Digital (A/D) converter. In other words, all subsequent signals and systems are discrete-time digital.

In other words, the following signals are discrete-time and digital: t, s(t) (103), Time stamp, t, $x_{r,i}(t)$, $x_{r,i,w}(t)$, f, $X_r(f)$, $X_{r,i}(f)$, $F(X_{r,i}(f),X_r(f))$, $H_t(f)$, $h_t(t)$.

Moreover, the following systems are also discrete-time and digital: Source (1101), Processor$_1$ (704), Processor$_2$ (1102), Processor$_3$ (1104), Processor$_4$ (1506), Acquisition Device (1103), sliding correlators (1201, 1402, 1501), Window$_1$ (1202), Window$_2$ (1502), Window$_3$ (1601), Fourier Transform (1203, 1503), Increment t (1301), Computing Means$_1$ (1504), Computing Means$_2$ (1604), Inverse SR Transform (1602).

When s(t) (103) is chosen to be the precursor of an AMPs-based CT, a preferred sampling frequency $f_s$ of the baseband signal $r_t(t)$ is 160 KHz. The symbol rate of the precursor of the RECC signal is 10 KHz. This gives 16 samples per data symbol for a total of 768 samples for the 48 symbols of the precursor. When the lock detect signal becomes active, correlation on the Barker sync word using the Sliding Correlator (1402) is initiated. As each new sample is received, the contents of a correlation buffer are shifted over by one sample and the contents of the buffer are correlated with a stored replica of the Barker word. Once a peak has been detected using the Peak Detector (1403) a counter counts up to xx data samples where xx is the known number of samples from the Barker correlation peak to the end of the precursor.

Preferred Length of the Truncating Windows (1401):

The intent of the Acquisition Device (1103) is to generate a Time Stamp corresponding to the existence of signal $r_t(t)$. In other words, when Decision Device (1404) decides that the Peak generated by Peak Detector (1403) is larger than a given Threshold a Trigger is generated and passed to the GPS Receiver (1405). A preferred length of the Truncating Windows (1401) is therefore one that produces a detectable Peak of magnitude larger than the set Threshold. The same applies for the preferred shape for the truncating windows. For example, when the WT is an AMPs-based CT, the truncated signal $r_w(t)$ could correspond to the 11-chip Barker Code that exists in the precursor over the RECC channel. In this case, a preferred shape for the truncating windows is a rectangular shape.

Preferred Embodiment of the GPS Receiver (1405):

When the counter reaches xx, a pulse is sent to the GPS Receiver (1405) and the entire baseband signal (precursor) which has been stored in a separate buffer, is downloaded to the controlling cell site computer. When the GPS Receiver (1405) is pulsed it records a time stamp in GPS time to the controlling computer. This time stamp is later used to assign a TOA for the cell site. The GPS Receiver (1405) operates in time transfer mode. The position of each cell site is accurately surveyed beforehand in DGPS carrier phase mode with an accuracy better than 10 cm and the coordinates of the receiver are held fixed. This allows for all GPS observations to be used for solving the GPS receiver time offset. The accuracy of the receiver's time, in the absence of SA and with known location will be better than 30 nanoseconds as shown in Van Dierendonck et al., "Applications of Time Transfer Using NAVSTAR GPS," Global Positioning System, Volume II, The Institute of Navigation, Washington D.C., 1984. The presence of SA will increase the user equivalent range error. This corresponds to a timing error of $SA_{error}/\sqrt{n}$ where $SA_{error}$ is the error in range due to SA and n is the number of satellites used. A nominal value for the SPS (Standard Positioning Service) timing error, in the presence of SA, is 280 ns 2 DRMS (probability of 95% 98%) as shown in National Research Council, "The Global Positioning System, A Shared National Asset, Recommendations for Technical Improvements and Enhancements," National Academy Press, Washington D.C., 1995.

In the cellular positioning system proposed, coordinated time synchronization is possible as shown also in Van Dierendonck, A. J. et al., "Applications of Time Transfer Using NAVSTAR GPS," Global Positioning System, Volume II, The Institute of Navigation, Washington D.C., 1984. The common mode-common view technique may be used to improve time transfer accuracy analogous to the way DGPS improves positioning accuracy. If the GPS receivers at all cell sites track the same satellites, common errors will be reduced or even eliminated over short baselines when the TOA differences are formed in the hyperbolic trilateration estimation process. Common errors include satellite ephemeris and clock errors (including SA) as well as atmospheric errors. Errors not common to all receivers will of course be amplified by $\sqrt{2}$. This includes the above mentioned satellite and atmospheric errors for long baselines where these errors are weakly correlated between receivers. For short baselines (<10 km), the error budget will be dominated by receiver noise and error in the receiver coordinates. As a result, a relative timing accuracy of <5 ns between cell sites is possible for short baselines with high performance receivers and cm level relative accuracy receiver coordinates.

Preferred Embodiment of Processor$_3$ (1104):

Processor$_3$ (1104) performs a second correlation. However, in this case the correlation is on the entire precursor of the baseband signal $r_t(t)$ using Sliding Correlator (1501). The peak of the correlation sequence $x_{r,i}(t)$ is located and some of the correlation data on both sides of the peak of $x_{r,i}(t)$ are discarded using Window$_2$ (1502) thereby generating $x_{r,i,w}(t)$. The preferred value for the number of points remaining in $x_{r,i,w}(t)$ and the preferred shape of Window$_2$ depend on the transmitted signal s(t). For example, when s(t) is the RECC precursor for an AMPs-based WT, a preferred value for the number of points remaining in $x_{r,i,w}(t)$ $x_{r,i,w}(t)$ is 15 and a preferred shape for Window$_2$ is a rectangular window. The signal $x_{r,i,w}(t)$ is then Fourier transformed to form $X_{r,i}(f)$ in the frequency domain. Using Computing Means$_1$ (1504) the signal $X_{r,i}(f)$ is operated on using $X_r(f)$ to generate the function $F(X_{r,i}(f),X_r(f))$. A preferred function $F(X_{r,i}(f),X_r(f))$ consists of the following division: $X_{r,i}(f)/X_r(f)$.

Preferred Embodiment of Processor4 (1506):

Processor$_4$ (1506) bandlimits F(X$_{r,i}$(f),X$_r$(f)) using Window$_3$ (1601) thereby generating H$_t$(f). The preferred value for the number of points remaining in H$_t$(f) and the preferred shape of Window$_3$ depend on the transmitted signal s(t). For example, when s(t) is the RECC precursor for an AMPs-based WT, a preferred number of points in H$_t$(f) is 11 and a preferred shape for Window$_3$ is a rectangular window. The frequency domain signal H$_t$(f) is then transformed back to the time domain using Inverse SR Transform (1602) thereby generating h$_t$(t).

Preferred Embodiment of Inverse SR Transform (1602):

A preferred algorithm for Inverse SR Transform (1602) is to determine the group delay of the channel. Group delay is defined as the delay in the envelope of a signal as it passes through a channel as shown in Haykin, S. "An Introduction To Analog And Digital Communications," John Wiley & Sons, New York 1989. It represents the true delay of the signal through the channel and is given by $$\tau_g = -\frac{1}{2\pi} \frac{\partial \beta(f)}{\partial f}\bigg|_{f=f_c} \tag{1}$$

where $\beta(f)$ is the phase of the transfer function of the channel as a function of frequency and $f_c$ is the carrier frequency. Equation (1) clearly shows that the group delay is proportional to the slope of the phase response of the channel transfer function.

A second preferred algorithm for Inverse SR Transform (1602) is to use superresolution algorithms to inverse transform the result of the correlation in the frequency domain back to the time domain. Transforming back to the time domain with superresolution results in a finer resolution time peak than that obtained by direct correlation. Preferred superresolution methods are MUSIC and root MUSIC as explained by Haykin, S., "Adaptive Filter Theory," 2nd Edition, Prentice Hall, Englewood Cliffs, N.J., 1991. (Other superresolution methods exist and can be as effective). To transform from frequency to time, the standard MUSIC equations are modified as shown in Dumont, L. R., et al., "Super-resolution of Multipath Channels in a Spread Spectrum Location System," IEE Electronic Letters, Vol. 30, No. 19, pp. 1583–1584, Sep. 15, 1994. The standard MUSIC steering vector $$s(\omega) = [1 e^{-j\omega} \ldots e^{-j\omega M}]^T \tag{2}$$

where $\omega$ is the angular frequency, M is the transversal filter length, and $[\bullet]^T$ indicates transpose, is changed to $$s(\omega) = [1 e^{j\omega} \ldots e^{j\omega M}]^T \tag{3}$$

In addition, each value in the data vector from which the data matrix is composed, is divided by the total number of data points. The resulting time domain MUSIC spectrum is given by $$S_{MUSIC} = \frac{1}{s^H(\mu t) V_N V_N^H S(\mu t)} \tag{4}$$

where $\mu t$ is normalized time and $V_N$ consists of the noise subspace eigenvectors. For root MUSIC, $e^{j\mu t}$ is replaced with z and the MUSIC spectrum becomes $$S_{MUSIC} = \frac{1}{D(z)} \tag{5}$$

The root of D(z) closest to the unit circle should correspond to MUSIC's estimate of the peak in the time correlation sequence in normalized time. However, due to errors such as noise the roots may move radially as well as in phase. A sector search is therefore performed. The correlation lobe x$_{r,i,w}$(t) is centered at zero in the time domain. Only those zeros in the sector centered at zero phase are examined as potential candidates.

Once a root is selected, the normalized time is converted to absolute time using Computing Means$_2$ by $$t = \frac{\mu t N}{2\pi f_s} \tag{6}$$

where N is the number of FFT points and $f_s$ is the sampling frequency. The TOA in GPS time is then found by subtracting the length of the precursor from the GPS time stamp and adding the MUSIC TOA estimate.

A second interface with the cellular network is required in order to transmit the TOA estimates, mobile identification number and cell site identification to a central processing site for position estimation as shown in FIG. 4. One possibility for transmitting this information is to use the line dedicated to carrying cell site alarm information.

Preferred Embodiment of Position Estimator (403):

In FIG. 4 a preferred embodiment of Position Estimator (403) is explained as follows. For positioning and one way transmission there are four unknowns:

the time of signal transmission, latitude, longitude and altitude.

Therefore, TOA estimates (observations) from at least four MSs are required. (In case only the latitude and the longitude are needed, at least three MSs are required). When time of transmission $t_0$ is unknown, as in our case, but common to all MSs, three independent observations are obtained by differencing the TOAs between every pair of MSs. This is termed hyperbolic trilateration since the loci of constant range or TOA differences form a hyperbola. TOA estimates at three MSs yield two independent TOA differences. The intersection of the two hyperbolae corresponding to these TOA differences estimates the location. A primary advantage of hyperbolic trilateration is the common error canceling effect of differencing the TOA estimates. For example, if the transmitter of the WT to be located employs commercial crystals with a large number of parts per million (>50 ppm), the timing of the transmitted signal s(t) tend to drift with time causing biases in the TOA estimates. Such biases are cancelled by differencing the TOA estimates In the case where the number of observations exceeds the number of unknowns, errors in the observations disallow a unique solution. Both least squares and Kalman filtering are common methods of dealing with this redundancy by minimizing the sum of the square of the residuals under the assumption that the observational errors are symmetrically distributed with zero mean. In the case of the urban cellular radio channel, multipath can be the dominant observational error source. Since multipath always causes the measured range to be longer than truth, a bias will exist in the observations. In addition, errors due to multipath are not random as shown in Turin, G. L. et al., "A Statistical Model of Urban Multipath Propagation," IEEE Transactions on Vehicular Technology, Vol. VT-21, No. 1, February 1972. Therefore, where multipath exists the observational noise is not normally distributed with zero mean. Robust procedures are one method of dealing with the estimation process when the underlying assumptions are not true as shown in Huber, P. J. Robust Statistics, John Wiley & Sons, New York, 1981.

A preferred method to estimate the WT position from the observed TDOA is Parametric Least Squares. Let N be the number of MSs involved in the solution. Without1 loss of generality, the symbol x shall represent the unknown three-dimension position of the WT and 1 the TDOA observations, i.e.

$$x = \begin{bmatrix} x \\ y \\ z \end{bmatrix}$$

and $$l = \begin{bmatrix} TDOA_{2,1} \\ TDOA_{3,1} \\ \ldots \\ TDOA_{N,1} \end{bmatrix}$$

The mathematical model used is $$w = \begin{bmatrix} TDOA_{2,1} - \frac{1}{c}\sqrt{(x-x_2)^2 + (y-y_2)^2 + (z-z_2)^2} + \frac{1}{c}\sqrt{(x-x_1)^2 + (y-y_1)^2 + (z-z_1)^2} \\ TDOA_{3,1} - \frac{1}{c}\sqrt{(x-x_3)^2 + (y-y_3)^2 + (z-z_3)^2} + \frac{1}{c}\sqrt{(x-x_1)^2 + (y-y_1)^2 + (z-z_1)^2} \\ \ldots \\ TDOA_{N,1} - \frac{1}{c}\sqrt{(x-x_N)^2 + (y-y_N)^2 + (z-z_N)^2} + \frac{1}{c}\sqrt{(x-x_1)^2 + (y-y_1)^2 + (z-z_1)^2} \end{bmatrix}$$

where $TDOA_{i,1}$ is the Time Difference of Arrival between the ith MS and the first, and $(X_i, Y_i, Z_i)$ are the three-dimensional coordinates of the ith MS for i=1, ..., N.

The hyperbolic trilateration equations W are a nonlinear function of (X,Y,Z) and must be linearized for use in Least Squares. The linearization process requires an iterative approach which may be implemented using a Taylor series expansion. Other methods exist which linearize a non-linear problem without the need for iterations. Such closed form solutions include the spherical interpolation, spherical intersection, and plane intersection methods as shown in Smith, J. O. et al., "Closed-Form Least-Squares Source Location Estimation from Range-Difference Measurements," IEEE Transactions on Acoustics, Speech, and Signal Processing, Vol. ASSP-35, No. 12, December, 1987, as well as the feasible bivector method as in Schmidt, R., "Least Squares Range Difference Location," IEEE Transactions on Aerospace and Electronic Systems, Vol. 32, No. 1, January 1996.

Using the iterative approach to linearize the model, the function W is expanded by a Taylor series with respect to approximate coordinates of the WT. The series is truncated after the first order terms. The linear explicit Least Squares problem may then be expressed by $$l \approx Ax$$

$$A = \begin{bmatrix} \frac{\partial [w]_1}{\partial x} & \frac{\partial [w]_1}{\partial y} & \frac{\partial [w]_1}{\partial z} \\ \frac{\partial [w]_2}{\partial x} & \frac{\partial [w]_2}{\partial y} & \frac{\partial [w]_2}{\partial z} \\ \ldots & \ldots & \ldots \\ \frac{\partial [w]_3}{\partial x} & \frac{\partial [w]_3}{\partial y} & \frac{\partial [w]_3}{\partial z} \end{bmatrix}$$

where and $[W]_i$ is the ith element in W.

For the mathematical model shown, the explicit form of A is $$A = \begin{bmatrix} \frac{-\frac{1}{c}(x-x_2)}{r_2} + \frac{\frac{1}{c}(x-x_1)}{r_1} & \frac{-\frac{1}{c}(y-y_2)}{r_2} + \frac{\frac{1}{c}(y-y_1)}{r_1} & \frac{-\frac{1}{c}(z-z_2)}{r_2} + \frac{\frac{1}{c}(z-z_1)}{r_1} \\ \frac{-\frac{1}{c}(x-x_3)}{r_3} + \frac{\frac{1}{c}(x-x_1)}{r_1} & \frac{-\frac{1}{c}(y-y_3)}{r_3} + \frac{\frac{1}{c}(y-y_1)}{r_1} & \frac{-\frac{1}{c}(z-z_3)}{r_3} + \frac{\frac{1}{c}(z-z_1)}{r_1} \\ \ldots & \ldots & \ldots \\ \frac{-\frac{1}{c}(x-x_N)}{r_N} + \frac{\frac{1}{c}(x-x_1)}{r_1} & \frac{-\frac{1}{c}(y-y_N)}{r_N} + \frac{\frac{1}{c}(y-y_1)}{r_1} & \frac{-\frac{1}{c}(z-z_N)}{r_N} + \frac{\frac{1}{c}(z-z_1)}{r_1} \end{bmatrix}$$

where $$r_i = \sqrt{(x-x_i)^2 + (y-y_i)^2 + (z-z_i)^2}.$$

Corrections to the approximate WT coordinates are calculated by $$\delta = -[A^T C_1^{-1} A]^{-1} A^T C_1^{-1} W$$

where $C_1$ is the covariance matrix of the observations. Corrected coordinates are then substituted back into the design matrix A and the misclosure W for the next iteration.

An alternative to the least squares method is Maximum Likelihood (ML) Traditionally, multivariate nonlinear maximization has not been popular due to the high computational load. Recently, however, efficient algorithms such as alternating projection have been developed (e.g. Ziskind, I. et al., "Maximum Likelihood Localization of Multiple Sources by Alternating Projection," IEEE Transactions on Acoustics, Speech, and Signal Processing, Vol. ASSP-36, No. 10, October, 1988). Maximum likelihood estimation based on statistical distributions for multipath, and iterative hill-climbing algorithms have been shown to give more accurate position estimates under certain conditions such as in Morley, G. D. et al., "Improved Location Estimation with pulse-ranging in presence of shadowing and multipath excess-delay effects," Electronics Letters, Vol. 31, No. 18, pp. 1609–1610, 31st Aug. , 1995.

When Maximum Likelihood (ML) is used to estimate the WT position from TOA measurements, it assumes a statistical distribution for the TOA errors. That position which maximizes the joint probability density function for the given ranges is chosen as the position estimate. Empirically derived PDF's for excess range due to multipath are available. The excess range for the ith MS is mathematically expressed as $$f_i(x, y, z, t_0) = c \cdot (TOA_i - t_0) - \sqrt{(x_i - x)^2 + (y_i - y)^2 + (z_i - z)^2}$$

where $t_0$ is the time of transmission at the WT.

If all excess ranges are independent, the joint probability density function $G(x,y,z)$ can be expressed as $$G(x, y, z) = \prod_{i=1}^{N} g[f_i(x, y, z, t_0)]$$

where $g[f_i(x,y,z)]$ is the probability of the excess range error $f_i(x,y,z,t_0)$ according to some assumed PDF for excess range. The ML estimate for the WT position is that set of coordinates $(x,y,z)$ for which $G(x,y,z)$ is a maximum. The ML solution may be found by calculating $G(x,y,z)$ at the nodes of a fine grid and choosing that location which maximizes $G(x,y,z)$ An alternative method is to assume approximate coordinates $(x,y,z)_i$ for the WT and calculate the gradient $\nabla G(x,y,z)_i$ of the objective function $G(x,y,z)_i$ using $(x,y,z)_i$. A step of length one "stepsize" is then taken in the direction of the gradient function $\nabla G(x,y,z)_i$ to form the new set of coordinates $(x,y,z)_{i+1}$. The equation to implement this is as follows:

$$(x,y,z)_{i+1} = (x,y,z)_i + \nabla G(x,y,z)_i \cdot stepsize$$

where $\nabla G(x,y,z)_i$ is defined as $$\nabla G(x, y, z)_i = \left( \frac{G(x + \Delta x, y, z)_i - G(x, y, z)_i}{\Delta x}, \frac{G(x, y + \Delta y, z)_i - G(x, y, z)_i}{\Delta y}, \frac{G(x, y, z + \Delta z)_i - G(x, y, z)_i}{\Delta z} \right)$$

This is continued until the value of the objective function $G(x,y,z)_{i+1}$ at the new set of coordinates $(x,y,z)_{i+1}$ is less than the objective function $G(x,y,z)_i$ at the previous set of coordinates $(x,y,z)_i$. In this way the objective function is maximized and the ML estimate of position is found.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A wireless location system comprising:
   a plurality of monitoring stations (MS) and a central site (CS);
   each monitoring station including (a) a transceiver for monitoring a signal s(t) transmitted from a wireless transmitter and generating an estimate of the time of arrival (TOA) of the received signal relative to a time reference using an inverse transform whose resolution is greater than Rayleigh resolution and (b) a communication link to transmit the estimated TOA from the monitoring station to the central site; and
   the central site including (a) a difference unit that computes the time difference of arrival (TDOA) between each estimated TOA and a preselected TOA and (b) a position estimator which processes all TDOAs and generates an estimate of the position of the wireless transmitter.

2. The wireless location system of claim 1 in which each transceiver includes:
   an RF receiver front end for filtering, amplifying and demodulating the received signal thereby generating a filtered, amplified and demodulated signal $r_f(t)$; and
   a first processor for estimating the time of arrival (TOA) of the filtered, amplified and demodulated signal $r_f(t)$ relative to a time reference.

3. The wireless location system of claim 2 in which the RF receiver front end includes:
   a receiver multicoupler for filtering and amplifying the received signal; and
   an RF-to-baseband (RF-to-BB) receiver for demodulating the filtered and amplified signal thereby generating a filtered, amplified and demodulated signal $r_f(t)$.

4. The wireless location system of claim 3 in which the receiver multicoupler includes:
   a preselect filter for filtering the received signal;
   a first low noise amplifier (LNA) for amplifying the filtered signal; and
   a 1:6 splitter for splitting the amplified and filtered signal into six replicas.

5. The wireless location system of claim 3 in which the RF-to-BB receiver includes:
   plural intermediate frequencies (IF) and LNA stages for down-converting and amplifying the signal generated by the receiver multicoupler; and
   a demodulator for demodulating the down-converted and amplified signal into a baseband signal $r_f(t)$.

6. The wireless location system of claim 5 in which the demodulator is selected from the group consisting of an Inphase and Quadrature demodulator and an an FM demodulator.

7. The wireless location system of claim 6 in which the FM demodulator includes a phase lock loop (PLL).

8. The wireless location system of claim 2 in which the first processor includes:
   a source which generates a generic received signal r(t);
   a second processor which processes the generic received signal r(t) thereby generating the power spectral density $X_r(f)$ of r(t);
   an acquisition device which processes the generic received signal r(t) together with the demodulated signal $r_f(t)$ to generate a time stump; and
   a third processor which processes the power spectral density $X_r(f)$, the generic received signal r(t), the time stamp and the demodulated signal $r_i(t)$ to estimate the TOA of the demodulated signal $r_i(t)$ relative to a time reference.

9. The wireless location system of claim 8 in which the second processor includes:
a first sliding correlator for correlating the generic received signal r(t) with itself thereby generating an autocorrelation function $\chi_r(r)$ of r(t);
a first window for windowing parts of the autocorrelation function $\chi_r(c)$ around its peak thereby generating a windowed autocorrelation function $X_{r,w}(r)$; and
a Fourier transform for transforming the windowed autocorrelation function $X_{r,w}(r)$ to the frequency domain thereby generating a power spectral density $X_r(f)$ of r(t).

10. The wireless location system of claim 9 in which the first sliding correlator includes:
a first counter for incrementing the delay $\tau$ from the value 0 to the duration of r(t);
a first delay element for delaying the generic received signal r(t) by the delay $\tau$ thereby generating the delayed signal r(t+$\tau$); and
a first correlator for computing the correlation between the delayed signal r(t+$\tau$) and the generic received signal r(t) thereby generating an autocorrelation function $\chi_r(\tau)$ of r(t).

11. The wireless location system of claim 9 in which the duration of the first window is equal to the duration of the second window when the transmitted signal s(t) is a precursor on a reverse control channel transmitted by an AMPs-based wireless transmitter.

12. The wireless location system in claim 9 in which the third processor includes:
a third sliding correlator for correlating the generic received signal r(t) with the demodulated signal $r_i(t)$ thereby generating a crosscorrelation $X_{r,i}(\tau)$;
a second window for windowing parts of the crosscorrelation function $X_{r,i}(\tau)$ around its peak thereby generating a windowed autocorrelation function $X_{r,i,w}(\tau)$;
a Fourier transform for transforming the windowed crosscorrelation function $X_{r,i,w}(\tau)$ to the frequency domain thereby generating a signal $X_{r,i}(f)$;
a first computing means for computing a function $F(X_{r,i}(f), X_r(f))$ of signal $X_{r,i}(f)$ and of the autocorrelation $X_r(f)$; and
a fourth processor for processing the function $F(X_{r,i}(f), X_r(f))$ and the time stamp thereby generating an estimate of the TOA of the demodulated signal $r_i(t)$ relative to the time stamp.

13. The wireless location system of claim 12 in which the fourth processor includes:
a third window for windowing parts of the function $F(X_{r,i}(f), X_r(f))$ around its peak thereby generating a windowed function $H_i(f)$;
an inverse superresolution (SR) transform for inverse transforming the windowed function $H_i(f)$ from the frequency domain to the time domain thereby generating an estimate $h_i(\tau)$ of the impulse response of the RF propagation channel;
a second peak detector to detect the first peak of the estimate $h_i(\tau)$ thereby generating a time $\tau_i$ of the occurrence of the peak; and
a second computing means for computing the estimate of the TOA of the demodulated signal $r_i(t)$ relative to the time stamp using the time $\tau_i$ of the occurrence of the peak.

14. The wireless location system of claim 13 in which the duration of the third window is 11 samples when observing a precursor on a reverse control channel transmitted by an AMPs-based wireless transmitter.

15. The transceiver of claim 13 in which the inverse SR transform consists of one of:
a method whereby group delay $\tau_g$ of the windowed function $H_i(f)$ is obtained thereby generating an estimate $h_i(\tau)$ of the impulse response of the RF propagation channel as a single unit impulse with a delay $\tau_g$; or
a method whereby the estimate $h_i(\tau)$ of the impulse response of the RF propagation channel is obtained by transforming $H_i(f)$ from the frequency domain to the time domain using root MUSIC.

16. The wireless location system of claim 12 in which the duration of the first window is equal to the duration of the second window when the transmitted signal s(t) is a precursor on a reverse control channel transmitted by an AMPs-based wireless transmitter.

17. The wireless location system of claim 12 in which the first computing means computes the function $X_{r,i}(f)/X_r(f)$.

18. The wireless location system of claim 8 in which the acquisition device includes:
a set of two truncating windows for truncating a segment of the generic received signal r(t) and a segment of the demodulated signal $r_i(t)$ thereby generating truncated signals $r_w(t)$ and $r_{w,i}(t)$ respectively;
a second sliding correlator for correlating the truncated signal $r_w(t)$ with the truncated signal $r_{w,i}(t)$ thereby generating a cross-correlation function $Y_{r,i}(\tau)$;
a first peak detector to detect the peak of the crosscorrelation function $Y_{r,i}(\tau)$;
a decision device which compares the magnitude of the detected peak to a preselected threshold thereby generating a trigger signal if the magnitude of the peak of the crosscorrelation function $Y_{r,i}(\tau)$ is larger than the preselected threshold; and
a GPS receiver which generates a time stamp whenever it receives a trigger from the decision device.

19. The wireless location system of claim 18 in which the GPS receiver operates in time transfer mode and is positioned to observe the same satellite at all monitoring stations.

20. The wireless location system of claim 1 in which the system is to be used with the AMPs cellular system, which includes a reverse control channel and a reverse voice channel and the transmitted signal s(t) is selected from the group consisting of:
a precursor signal on the reverse control channel (RECC);
precursor and registration signals on the reverse control channel (RECC); and
a blank-and-burst signal on the reverse voice channel (RVC).

21. The wireless location system of claim 1 in which the position estimator solves for one of:
two coordinates using three MSs using hyperbolic trilateration; or
three coordinates using four MSs using hyperbolic trilateration; or
two coordinates using more than three MSs using hyperbolic trilateration and one of parametric least squares, Kalman filtering or maximum likelihood; or
three coordinates using more than four MSs using hyperbolic trilateration and one of parametric least squares, Kalman filtering or maximum likelihood.

22. A method of estimating the location of a wireless transmitter, the method comprising the steps of:

monitoring a signal s(t) transmitted from the wireless transmitter at each one of a plurality of MSs;

estimating the time of arrival (TOA) of the received signal relative to a time reference at each one of the plurality of MSs using an inverse transform whose resolution is greater than Rayleigh resolution;

transmitting the estimated TOA from each one of the plurality of MSs to a central site (CS);

computing the time difference of arrival (TDOA) between each estimated TOA and every other TOA at the CS; and processing all TDOAs to generate an estimate of the position of the transmitter.

23. The method of claim 22 in which monitoring the signal s(t) at each MS includes:

filtering, amplifying and demodulating the received signal thereby generating a filtered, amplified and demodulated signal $r_i(t)$; and estimating the TOA of the filtered, amplified and demodulated signal $r_i(t)$ relative to a time reference.

24. The method of claim 23 in which filtering and amplifying comprises:

preselect filtering the received signal;

low noise amplifying the filtered signal; and

1:6 splitting the amplified and filtered signal into six replicas.

25. The method of claim 24 in which demodulating comprises:

down-converting to several intermediate frequencies and amplifying over several stages the filtered and amplified signal; and demodulating the down-converted and amplified signal into a baseband signal $r_i(t)$.

26. The method of claim 25 in which demodulating the down-converted and amplified signal is carried out by one of to Inphase and Quadrature demodulating the signal or FM demodulating the signal.

27. The method of claim 23 in which estimating the TOA of the demodulated signal $r_i(t)$ relative to a time reference comprises:

generating a generic received signal r(t);

processing the generic received signal r(t) to generate a power spectral density $X_r(f)$ of r(t);

processing the generic received signal r(t) together with the demodulated signal $r_i(t)$ to generate a referenced time stamp; and processing the power spectral density $X_r(f)$, the generic received signal r(t), the referenced time stamp and the demodulated signal $r_i(t)$ to estimate the TOA of the demodulated signal $r_i(t)$ relative to a time reference.

28. The method of claim 27 in which processing the generic received signal r(t) to generate the power spectral density $X_r(f)$ of r(t) includes:

slide-correlating the generic received signal r(t) with itself thereby generating an autocorrelation function $\chi_r(\tau)$ of r(t);

windowing parts of the autocorrelation function $\chi_r(\tau)$ around its peak thereby generating a windowed autocorrelation function $X_{r,w}(\tau)$; and Fourier transforming the windowed autocorrelation function $X_{r,w}(\tau)$ to the frequency domain thereby generating a power spectral density $X_r(f)$ of r(t).

29. The method of claim 28 in which slide-correlating the generic received signal r(t) with itself thereby generating the autocorrelation function $\tau_r(r)$ of r(t) includes:

incrementing a counter by the delay $\tau$ from the value 0 to the duration of r(t);

delaying the generic received signal r(t) by the delay $\tau$ thereby generating the delayed signal r(t+$\tau$); and computing the correlation between the delayed signal r(t+t) and the generic received signal r(t) thereby generating the autocorrelation function $\tau_r(\tau)$ of r(t).

30. The method of claim 27 in which processing the generic received signal r(t) together with the demodulated signal $r_i(t)$ to generate a time stamp includes:

truncating a segment of the generic received signal r(t) and truncating a segment of the demodulated signal $r_i(t)$ thereby generating the truncated signals $r_w(t)$ and $r_{w,i}(t)$ respectively;

slide-correlating the truncated signal $r_w(t)$ with the truncated signal $r_{w,i}(t)$ thereby generating their crosscorrelation function $Y_{r,i}(\tau)$;

detecting the peak of the crosscorrelation function $Y_{r,i}(\tau)$;

comparing the magnitude of th e detected peak to a preselected threshold thereby generating a trigger signal if the magnitude of the peak of the crosscorrelation function $Y_{r,i}(\tau)$ is larger than the preselected threshold; and generating a referenced time stamp whenever a trigger is generated.

31. The method of claim 30 in which generating a referenced time stamp whenever a trigger is generated includes using either a GPS receiver or a high precision clock.

32. The method in claim 27 in which processing the power spectral density $X_r(f)$, the generic received signal r(t), the referenced time stamp and the demodulated signal $r_i(t)$ to estimate the TOA of the demodulated signal $r_i(t)$ relative to a time reference includes:

slide-correlating the generic received signal r(t) with the demodulated signal $r_i(t)$ thereby generating a crosscorrelation $\chi_{r,i}(\tau)$;

windowing parts of the crosscorrelation function $\chi_{r,i}(\tau)$ around its peak thereby generating a windowed autocorrelation function $\chi_{r,i,w}(\tau)$;

Fourier transforming the windowed crosscorrelation function $\chi_{r,i,w}(\tau)$ to the frequency domain thereby generating the signal $X_{r,i}(f)$;

computing a function $F(X_{r,i}(f),X_r(f))$ of signal $X_{r,i}(f)$ and of the autocorrelation $X_r(f)$; and processing the function $F(X_{r,i}(f),X_r(f))$ and the referenced time stamp thereby generating an estimate of the TOA of the demodulated signal $r_i(t)$ relative to the referenced time stamp.

33. The method of claim 32 in which processing the function $F(X_{r,i}(f),X_r(f))$ and the time stamp thereby generating an estimate of the TOA of the demodulated signal $r_i(t)$ relative to the referenced time stamp includes:

windowing parts of the function $F(X_{r,i}(f),X_r(f))$ around its peak thereby generating a windowed function $H_i(f)$;

inverse superresolution (SR) transforming the windowed function $H_i(f)$ from the frequency domain to the time domain thereby generating the estimate $h_i(\tau)$ of the impulse response of the RF propagation channel;

detecting the first peak of the estimate $h_i(\tau)$ thereby generating a time $\tau_i$ of the occurrence of the first peak; and estimating the TOA of the demodulated signal $r_i(t)$ relative to the referenced time stamp using the time $\tau_i$ of the occurrence of the first peak.

34. The transceiver of claim 33 in which inverse super-resolution (SR) transforming the windowed function $H_i(f)$ from the frequency domain to the time domain thereby generating the estimate $h_i(\tau)$ of the impulse response of the RF propagation channel consists of one of:

a method whereby the group delay $\tau_g$ of the windowed function $H_i(f)$ is obtained thereby generating the estimate $h_i(\tau)$ of the impulse response of the RF propagation channel as a single unit impulse with a delay $\tau_g$; or a method whereby the estimate $h_i(\tau)$ of the impulse response of the RF propagation channel is obtained by transforming $H_i(f)$ from the frequency domain to the time domain using root MUSIC.

35. The transceiver of claim 32 in which computing a function $F(X_{r,i}(f),X_r(f))$ of signal $X_{r,i}(f)$ and of the autocorrelation $X_r(f)$ corresponds to computing the function $X_{r,i}(f)/X_r(f)$.

36. The method of claim 33 in which windowing parts of the function $F(X_{r,i}(f),X_r(f))$ around its peak thereby generating a windowed function $H_i(f)$ comprises discarding all the samples in $F(X_{r,i}(f),X_r(f))$ except for 11 samples around its peak when the transmitted signal s(t) is the RECC precursor transmitted by an AMPs-based wireless transmitter.

37. The method of claim 22 in which processing all TDOAs to generate an estimate of the position of the transmitter solves for one of:

two coordinates using three MSs using hyperbolic trilateration; or three coordinates using four MSs using hyperbolic trilateration; or two coordinates using more than three MSs using hyperbolic trilateration and one of parametric least squares, Kalman filtering or maximum likelihood; or three coordinates using more than four MSs using hyperbolic trilateration and one of parametric least squares, Kalman filtering or maximum likelihood.

* * * * *

UNITED STATES PATENT AND TRADEMARK OFFICE
CERTIFICATE OF CORRECTION

PATENT NO. : 5,890,068
DATED : March 30, 1999
INVENTOR(S) : M.T. Fattouche et al.

It is certified that error appears in the above-identified patent and that said Letters Patent is hereby corrected as shown below:

| COLUMN | LINE | |
|---|---|---|
| 22 (Claim 8, | 65 line 9) | "stump;" should read --stamp;-- |
| 23 (Claim 9, | 8 line 5) | "$\chi_r(r)$" should read --$\chi_r(\tau)$-- |
| 23 (Claim 9, | 10 line 7) | "$\chi_r(c)$" should read --$\chi_r(\tau)$-- |
| 23 (Claim 9, | 11 line 8) | "$X_{r,w}(r);$" should read --$X_{r,w}(\tau);$-- |
| 23 (Claim 9, | 13 line 10) | "$X_{r,w}(r)$" should read --$X_{r,w}(\tau)$-- |
| 25 (Claim 28, | 60 line 5) | "$\chi_r(r)$" should read --$\chi_r(\tau)$-- |
| 26 (Claim 29, | 3 line 3) | "$\tau_r(r)$" should read --$\chi_r(\tau)$-- |
| 26 (Claim 29, | 10 line 10) | "$\tau_r(\tau)$" should read --$\chi_r(\tau)$-- |

UNITED STATES PATENT AND TRADEMARK OFFICE
CERTIFICATE OF CORRECTION

PATENT NO. : 5,890,068
DATED : March 30, 1999
INVENTOR(S) : M.T. Fattouche et al.

It is certified that error appears in the above-identified patent and that said Letters Patent is hereby corrected as shown below:

| COLUMN | LINE | |
|---|---|---|
| 26 (Claim 30, | 23 line 12) | "th e" should read --the-- |

Signed and Sealed this

Twenty-first Day of September, 1999

Attest:

Q. TODD DICKINSON

*Attesting Officer*     *Acting Commissioner of Patents and Trademarks*